(12) United States Patent
Saito et al.

(10) Patent No.: US 10,330,917 B2
(45) Date of Patent: Jun. 25, 2019

(54) OPTICAL FILTER DEVICE, OPTICAL MODULE, AND ELECTRONIC APPARATUS

(71) Applicant: Seiko Epson Corporation, Tokyo (JP)

(72) Inventors: Daisuke Saito, Matsumoto (JP); Satoshi Fujisawa, Tatsuno (JP); Yasushi Matsuno, Matsumoto (JP); Nozomu Hirokubo, Fujimi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/865,513

(22) Filed: Sep. 25, 2015

(65) Prior Publication Data

US 2016/0091644 A1    Mar. 31, 2016

(30) Foreign Application Priority Data

Sep. 29, 2014    (JP) .................................. 2014-198455

(51) Int. Cl.
| | |
|---|---|
| *G01J 3/26* | (2006.01) |
| *G02B 5/28* | (2006.01) |
| *G02B 7/00* | (2006.01) |
| *G02B 26/00* | (2006.01) |

(52) U.S. Cl.
CPC .............. *G02B 26/001* (2013.01); *G01J 3/26* (2013.01); *G02B 5/288* (2013.01); *G02B 7/006* (2013.01)

(58) Field of Classification Search
CPC . G02B 5/20; G02B 5/201; G02B 5/28; G02B 5/284; G02B 26/001; G01J 3/26
USPC .................. 359/260, 577–579; 356/450–521
See application file for complete search history.

(56) References Cited

U.S. PATENT DOCUMENTS

| | | | |
|---|---|---|---|
| 5,405,476 A | 4/1995 | Knecht | |
| 6,985,281 B2 | 1/2006 | Wagner et al. | |
| 7,514,685 B2 | 4/2009 | Yoshida | |
| 2007/0097479 A1* | 5/2007 | Yasuda ..................... | G01J 3/26 359/260 |
| 2009/0282915 A1* | 11/2009 | Ohta ..................... | B81B 7/0058 73/504.12 |
| 2009/0320593 A1 | 12/2009 | Nakashio et al. | |
| 2009/0323165 A1* | 12/2009 | Sampsell ............ | B81C 1/00317 359/290 |
| 2012/0120402 A1* | 5/2012 | Hirokubo .................. | G01J 3/26 356/450 |
| 2012/0194821 A1 | 8/2012 | Nozawa | |

(Continued)

FOREIGN PATENT DOCUMENTS

| | | |
|---|---|---|
| CN | 1116459 A | 2/1996 |
| CN | 102621613 A | 8/2012 |

(Continued)

OTHER PUBLICATIONS

Extended European Search Report for EP Application No. 15202385. 9, dated May 27, 2016 (9 pages).

*Primary Examiner* — Kimberly N. Kakalec
(74) *Attorney, Agent, or Firm* — Harness, Dickey & Pierce, P.L.C.

(57) ABSTRACT

An optical filter device includes a wavelength variable interference filter that includes a pair of reflective films which face each other, and a fixed substrate in which one of the pair of reflective films is provided; a base to which the fixed substrate is fixed; and a fixing member which fixes one place on the fixed substrate to the base, a surface which is on other place of the one place of the substrate and the base are disposed with a gap therebetween.

20 Claims, 15 Drawing Sheets

(56) References Cited

U.S. PATENT DOCUMENTS

| | | | |
|---|---|---|---|
| 2012/0206731 A1* | 8/2012 | Sano | G01J 3/26 356/450 |
| 2012/0312094 A1* | 12/2012 | Uchida | G01C 19/5628 73/504.04 |
| 2013/0075596 A1 | 3/2013 | Matsuno et al. | |
| 2013/0208359 A1 | 8/2013 | Matsuno et al. | |
| 2013/0308134 A1 | 11/2013 | Hirokubo | |
| 2014/0177058 A1 | 6/2014 | Koike | |
| 2014/0285895 A1 | 9/2014 | Saito et al. | |
| 2015/0029590 A1 | 1/2015 | Hirokubo | |
| 2018/0157026 A1 | 6/2018 | Hirokubo | |

FOREIGN PATENT DOCUMENTS

| | | |
|---|---|---|
| CN | 103245998 A | 8/2013 |
| CN | 103424865 A | 12/2013 |
| CN | 104345365 A | 2/2015 |
| JP | H06-241898 A | 9/1994 |
| JP | 2005-510756 A | 4/2005 |
| JP | 2006-042005 A | 2/2006 |
| JP | 2007-152501 A | 6/2007 |
| JP | 2008-070163 A | 3/2008 |
| JP | 2012-185427 A | 9/2012 |
| JP | 2013-072981 A | 4/2013 |
| JP | 2013-153345 A | 8/2013 |
| JP | 2013-167701 A | 8/2013 |
| JP | 2015-025942 A | 2/2015 |
| JP | 2016-012097 A | 1/2016 |
| WO | WO-03-046630 A1 | 6/2003 |
| WO | WO-2008-001908 A1 | 1/2008 |

\* cited by examiner

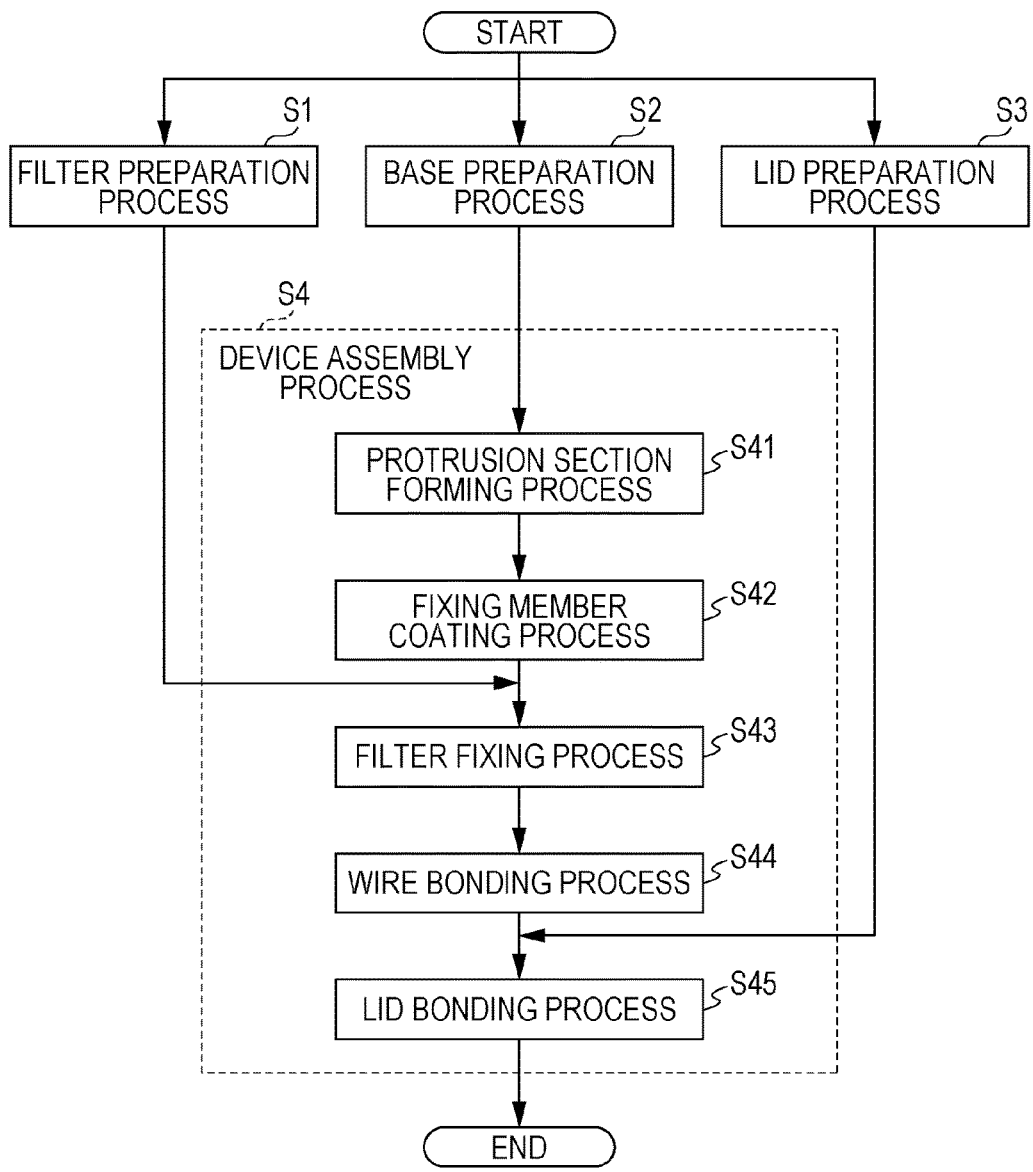

OPTICAL FILTER DEVICE, OPTICAL MODULE, AND ELECTRONIC APPARATUS

BACKGROUND

1. Technical Field

The present invention relates to an optical filter device, an optical module, and an electronic apparatus.

2. Related Art

In the related art, an optical filter device is known in which a case holds an interference filter including reflective films which are disposed to face each other via a predetermined gap on surfaces of a pair of substrates that face each other (for example, JP-A-2013-167701).

In the optical filter device described in JP-A-2013-167701, the case includes a base substrate to which the interference filter is fixed by a fixing member. One place on a facing surface, which faces the base substrate, of a substrate of the interference filter adheres to the base substrate to be fixed to the base substrate.

In the optical filter device, even if adhering to be fixed by using, for example, adhesive, stress received due to the adhesive can be decreased, compared to a configuration in which substantially the entire surface of the facing surface of the substrate adheres. That is, it is possible to reduce the influence of tensile stress caused by the adhesive that contracts at the time of curing, or stress that is generated by a thermal expansion coefficient difference between the substrate and the base substrate, as an adhering area of the facing surface of the substrate decreases.

However, since one place of the interference filter is fixed to the base substrate in a state in which the interference filter is in contact with the base substrate, when vibration caused by external disturbance is applied to the optical filter device, the vibration is transmitted to the interference filter via the base substrate, and thereby resolution of the interference filter can decrease. For example, as the interference filter to which the vibration is transmitted vibrates around the fixed place, a gap dimension between the reflective films may be changed. In addition, as the interference filter vibrates, distortion occurs in the substrate, and uniformity of the gap dimension can decrease along to a reflective surface. In this way, if the gap dimension is changed or the uniformity along to the surface decreases, there is a problem in which resolution of the interference filter decreases.

SUMMARY

An advantage of some aspects of the invention is to provide an optical filter device, an optical module, and an electronic apparatus which can prevent resolution of an interference filter from decreasing.

An optical filter device according to an application example of the invention includes an interference filter that includes an interference filter that includes a pair of reflective films which face each other, and a substrate on which one of the pair of reflective films is provided, a base section to which the substrate is fixed, and a fixing member which fixes one place of the substrate to the base section, wherein a surface which is on other place of the one place of the substrate and the base section are disposed with a gap therebetween.

The optical filter device according to the application example of the invention fixes one place on the substrate of the interference filter to the base section using the fixing member. Thus, a place other than the place that is fixed by the fixing member, in a surface of the substrate, and the base section are disposed with a gap therebetween.

Here, if one place on the substrate is fixed, the substrate of the interference filter may vibrate due to the influence of external disturbance, for example. Specifically, an example can be illustrated in which a fixed position of the fixing member as a fixed end, a position (farthest section) farthest away from the fixed end as a free end with the largest amplitude, and thereby natural vibration in a substrate thickness direction occurs.

In the present application example, since one place on the substrate is fixed by the fixing member, the place other than the fixed place on the substrate surface is not in contact with the base section, and thus it is possible to prevent vibration due to external disturbance from being transmitted to the substrate from the base section. For this reason, it is possible to prevent the vibration such as the natural vibration due to the influence of external disturbance from occurring. Thus, it is possible to prevent distortion of the substrate due to the vibration from occurring, and to prevent the resolution of the interference filter from decreasing due to the distortion of the substrate.

In the optical filter device of the present application example, it is preferable that the fixing member fixes a side surface along to a thickness direction of the substrate.

In the present application example, the fixing member fixes the side surface along to the thickness direction of the substrate at one place.

In general, a dimension of the thickness direction of the substrate is sufficiently smaller than a dimension of a plane direction intersecting the thickness direction. Thus, rigidity (resistance to bending) to the thickness direction of the substrate is less than that to the plane direction. For this reason, as described above, as the fixing member is provided in one place on the side surface, it is possible to change a direction of stress from the fixing member to the plane direction along to the side surface, and to prevent distortion of the substrate due to the stress from the fixing member from occurring. Thus, it is possible to prevent resolution of the interference filter from decreasing due to the distortion of the substrate.

In the optical filter device of the present application example, it is preferable that the fixing member is provided along to a side intersecting the thickness direction of the side surface.

In the present application example, the fixing member is provided along to a side intersecting the thickness direction of the side surface.

In the configuration, for example, the fixing member can be provided in substantially the entire surface of the side surface, and a fixed area can be increased, compared to a case in which a portion of the side surface of the fixing member is fixed. Accordingly, even if a material with low elasticity is used as the fixing member, it is possible to set a fixing force caused by the fixing member to a desired value or more, and to prevent the substrate from dropping out.

In the optical filter device of the present application example, it is preferable that the fixing member is elastically deformed by stress according to rotation of the substrate that arises the side surface as a fixed end.

In the present application example, the fixing member is elastically deformed by the stress according to the rotation of the substrate that arises the side surface as the fixed end.

Here, in the configuration in which the side surface of the substrate is fixed at one place, as described above, vibration in the substrate thickness direction in which a fixed position as a fixed end in the substrate may occur. In the vibration, the substrate is displaced in a rotation direction based on the fixed end, and thus stress according to the rotation of the substrate acts on the fixing member or the substrate in the fixed end.

In the present application example, by doing so, the fixing member is formed of a material with low elasticity of a degree at which the fixing member is elastically deformed by the stress. For this reason, even if an external force which generates the vibration due to influence of external disturbance or the like acts on the interference filter, the fixing member is elastically deformed, and thus it is possible to prevent the vibration from continuing.

In the optical filter device of the present application example, it is preferable that the base section faces the side surface and includes a fixed surface to which the side surface is fixed, and one of the side surface and the fixed surface includes a protrusion section which protrudes toward the other of the side surface and the fixed surface and comes into contact with the other.

In the present application example, the protrusion section protrudes from one of the side surface of the substrate and the fixed surface of the base section toward the other and comes into contact with the other. Thus, the fixing member is provided between the side surface and the fixed surface which are separated by the protrusion section.

In the configuration, a distance between the side surface and the fixed surface can be specified by a dimension of the protrusion direction of the protrusion section, and while the side surface and the fixed surface are separated from each other, the substrate is positioned with respect to the base section, thereby being fixed.

In addition, for example, if adhesive is used as the fixing member, it is possible to prevent a distance between the side surface and the fixed surface from being changed, and to increase positioning accuracy, even if cure shrinkage of the adhesive occurs in a direction in which the side surface approaches the fixed surface.

In the optical filter device of the present application example, it is preferable that one of the side surface and the fixed surface includes a plurality of the protrusion sections, and the protrusion section has a curved shape which protrudes toward the other.

In the present application example, the protrusion section has a curved shape which protrudes toward the other from one of the side surface and the fixed surface, and a plurality of protrusion sections are provided.

In the configuration, the protrusion section has a curved shape in which a sectional area in a direction along to the side surface and the fixed surface decreases, in the, and it is possible to reduce a contact area at the time of coming into contact with the other of the side surface and the fixed surface. Accordingly, it is possible to reliably prevent the vibration due to external disturbance from being transmitted from the base section. In addition, it is possible to decrease a contact area and to increase positioning accuracy by performing the contact using a plurality of protrusion sections.

In the optical filter device of the present application example, it is preferable that the protrusion section is provided on the fixed surface side and has modulus of elasticity higher than that of the fixing member.

In the present application example, the protrusion section is provided on the fixed surface of the base section, and is formed of a material with modulus of elasticity higher than that of the fixing member.

In the configuration, for example, the fixed surface is coated with a material which is cured from liquid to a solid, such as a thermosetting resin or a photocurable resin to be cured, and thereby the protrusion section can be easily formed. In addition, since the stress at the time of cure shrinkage does not act on the substrate of the interference filter, there is no distortion of the substrate caused by cure shrinkage, and it is possible to prevent resolution of the interference filter from decreasing.

In the optical filter device of the present application example, it is preferable that the interference filter includes a pair of reflective films which face each other; and a gap change section which changes a gap dimension of the pair of reflective films, the substrate includes a first substrate in which one of the pair of reflective films is provided; and a second substrate in which the other of the pair of reflective films is provided, the gap change section changes the gap dimension by bending the second substrate toward the first substrate, and the fixing member is elastically deformed by stress according to rotation of the substrate that uses a fixed position of the fixing member as a fixed end when the gap change section is driven.

In the present application example, a configuration is provided in which the second substrate is bent by the gap change and thus a gap dimension can be changed. In the configuration, when the gap change section bends the second substrate, the above-described vibration can occur in the interference filter due to the stress which acts on the interference filter according to the deformation of the second substrate. In this way, even if the vibration occurs in the interference filter, it is possible to suitably prevent the vibration from continuing as the fixing member is elastically deformed.

An optical module according to an application example of the invention includes an interference filter that includes a pair of reflective films which face each other, and a substrate in which one of the pair of reflective films is provided; a base section to which the substrate is fixed; a fixing member which fixes one place on the substrate to the base section; and a detection unit which detects light that is exited from the interference filter, a surface which is on other place of the one place that is fixed by the fixing member, and the base section are disposed with a gap therebetween.

In the present application example, as described above, it is possible to prevent resolution of the interference filter of the optical filter device from decreasing, and to exit light from the optical filter device in a state in which the resolution is maintained. Thus, it is possible for the light receiving unit of the optical module to detect an amount of light of a desired wavelength with high resolution.

An electronic apparatus according to an application example of the invention includes an interference filter that includes a pair of reflective films which face each other, and a substrate in which each of the pair of reflective films is provided; a base section to which the substrate is fixed; a fixing member which fixes one place on the substrate to the base section; and a processing unit which performs processing based on light that is exited from the interference filter, a surface which is on other place of the one place that is fixed by the fixing member, and the base section are disposed with a gap therebetween.

In the present application example, as described above, it is possible to prevent resolution of the interference filter of the optical filter device from decreasing, and to exit light from the optical filter device in a state in which the resolution is maintained. Thus, it is possible to provide an electronic apparatus which can perform accurate processing, based on light of high resolution which is emitted from the optical filter device.

BRIEF DESCRIPTION OF THE DRAWINGS

The invention will be described with reference to the accompanying drawings, wherein like numbers reference like elements.

FIG. 5 is a diagram illustrating a manufacturing process of the optical filter device according to the first embodiment.

DESCRIPTION OF EXEMPLARY EMBODIMENTS

First Embodiment

Figure 1:
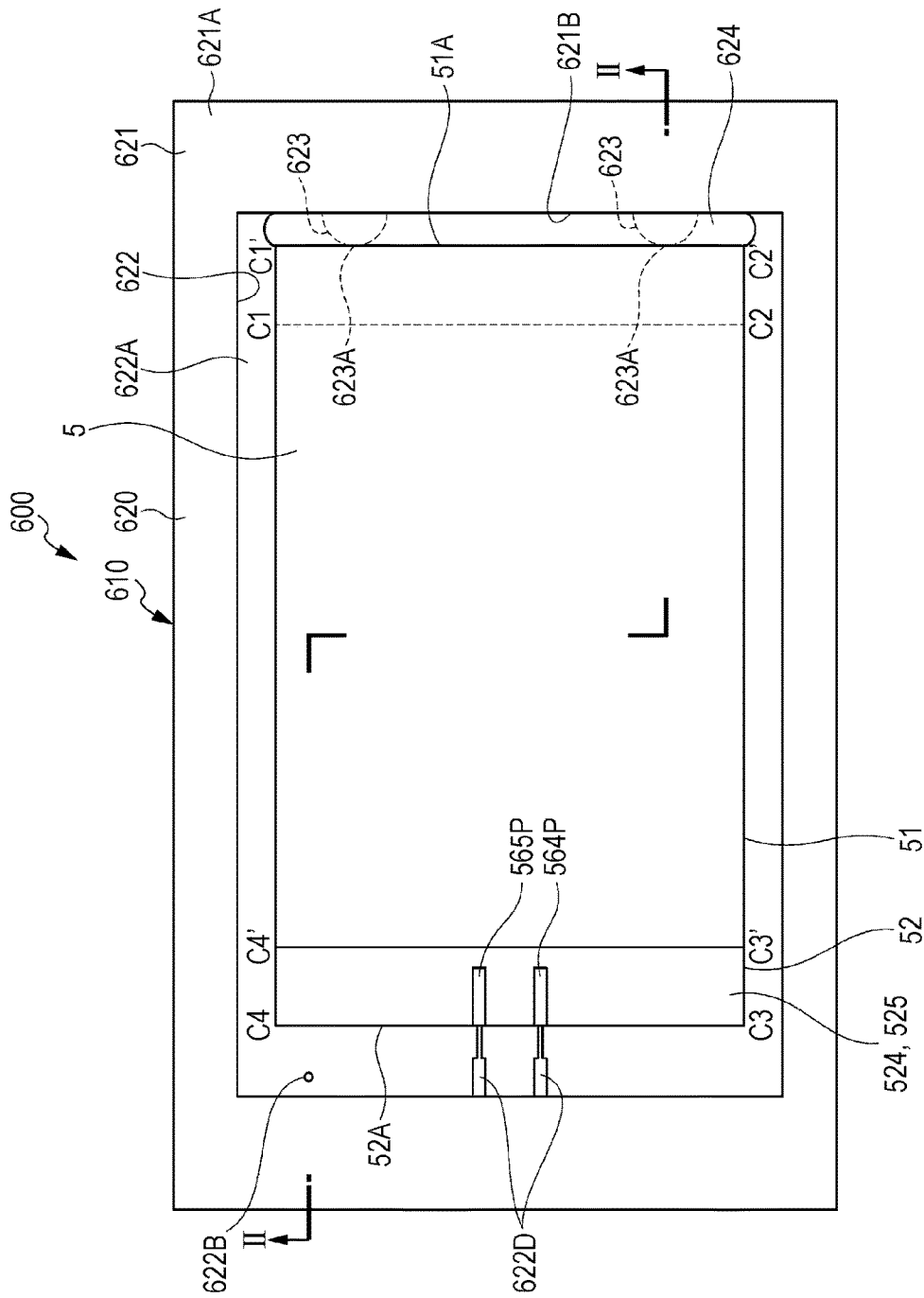
FIG. 1 is a plan view illustrating a schematic configuration of an optical filter device according to a first embodiment of the invention.
Figure 2:
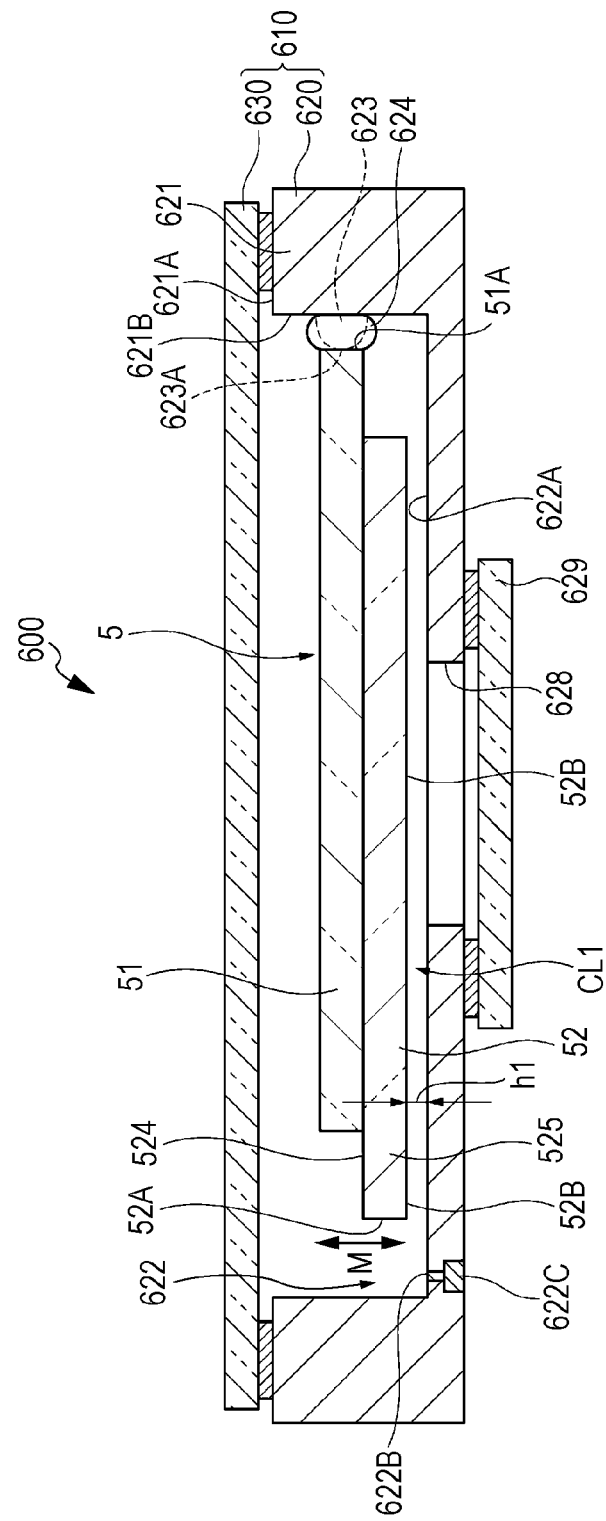
FIG. 2 is a sectional view illustrating a schematic configuration of the optical filter device according to the first embodiment.

A first embodiment according to the invention will be hereinafter described with reference to the accompanying drawing.
Configuration of Optical Filter Device FIG. 1 is a plan view illustrating a schematic configuration of an optical filter device 600 which is a first embodiment of an optical filter device according to the invention. FIG. 2 is a sectional view taken along line II-II of FIG. 1.

Figure 3:
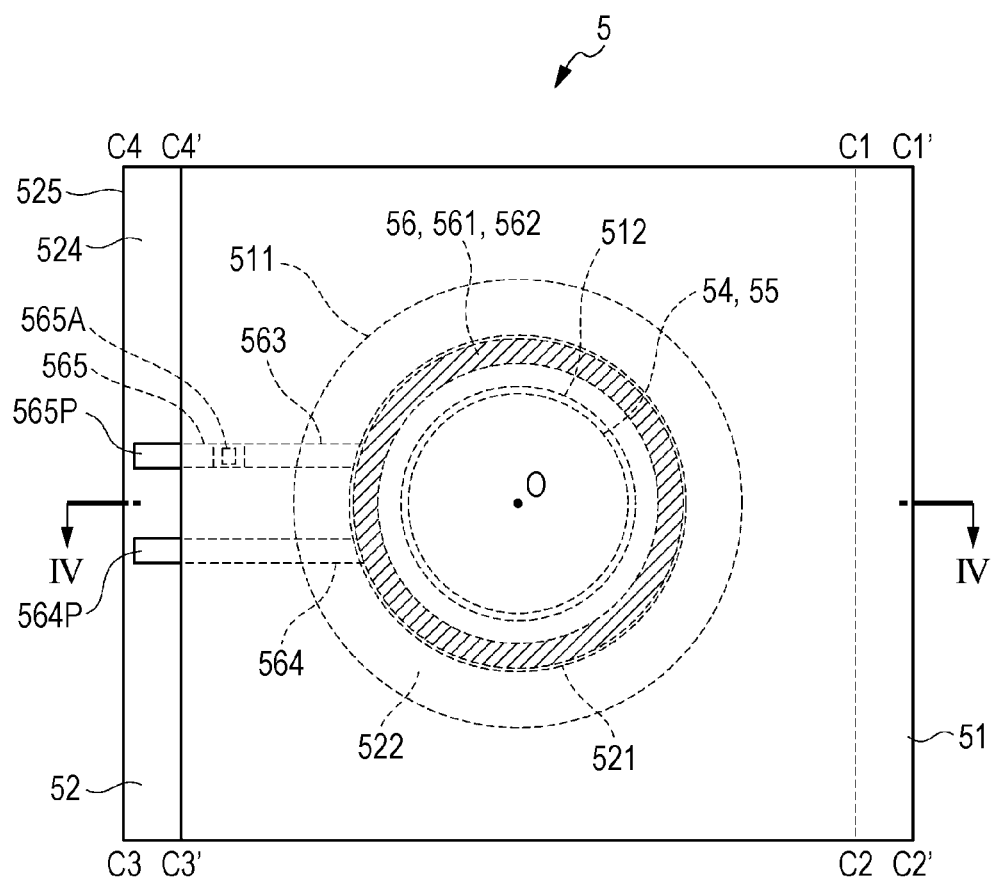
FIG. 3 is a plan view illustrating a schematic configuration of a wavelength variable interference filter according to the first embodiment.
Figure 4:
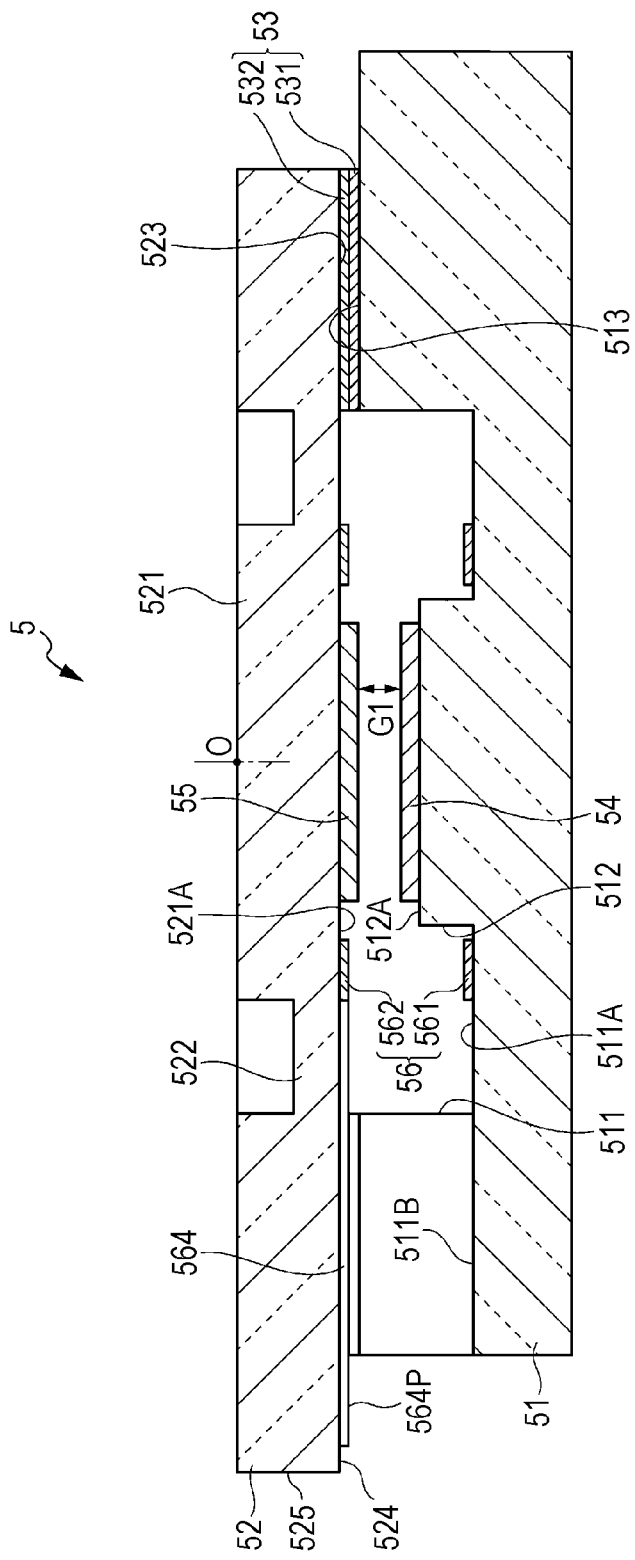
FIG. 4 is a sectional view illustrating the schematic configuration of the wavelength variable interference filter according to the first embodiment.

The optical filter device 600 extracts light with a predetermined target wavelength from inspection target light which is incident, and exits the light. The optical filter device 600 includes a case 610, and a wavelength variable interference filter 5 that is held in the case 610. The optical filter device 600 can be incorporated into an optical module such as a color measurement sensor, or an electronic apparatus such as a color measurement device or a gas analyzing device. The configuration of the optical module and the electronic apparatus which include the optical filter device 600 will be described in detail later.
Configuration of Wavelength Variable Interference Filter FIG. 3 is a plan view illustrating a schematic configuration of the wavelength variable interference filter 5. FIG. 4 is a sectional view illustrating the schematic configuration of the wavelength variable interference filter 5 taken along line IV-IV of FIG. 3.

As illustrated in FIG. 3 and FIG. 4, the wavelength variable interference filter 5 includes a fixed substrate 51 which corresponds to a first substrate of the invention, and a movable substrate 52 which corresponds to a second substrate of the invention. The fixed substrate 51 and the movable substrate 52 are respectively formed of, for example, various types of glass, crystal, or the like, and are assumed to be formed of quartz glass in the present embodiment. The substrates 51 and 52 are integrally configured by being bonded using a bonding film 53 (a first bonding film 531 and a second bonding film 532), as illustrated in FIG. 4. Specifically, the first bonding section 513 of the fixed substrate 51, and the second bonding section 523 of the movable substrate 52 are bonded together by the bonding film 53 which is configured by a plasma polymerization film or the like, for example, siloxane as a main component.

In the following description, a planar view which is viewed from a substrate thickness direction of the fixed substrate 51 or the movable substrate 52, that is, a planar view as the wavelength variable interference filter 5 is viewed from a direction in which the fixed substrate 51, the bonding film 53 are stacked, and the movable substrate 52, is referred to as a filter planar view.

As illustrated in FIG. 4, a fixed reflective film 54 which configures one of a pair of reflective films of the invention is provided on the fixed substrate 51. In addition, a movable reflective film 55 which configures the other of the pair of reflective films of the invention is provided on the movable substrate 52. The fixed reflective film 54 and the movable reflective film 55 are disposed so as to face each other via a gap G1 between the reflective films.

In addition, an electrostatic actuator 56 that corresponds to a gap change section of the invention which is used for adjusting a distance (gap dimension) of the gap G1 between the reflective films 54 and 55, is provided in the wavelength variable interference filter 5. The electrostatic actuator 56 includes a fixed electrode 561 that is provided on the fixed substrate 51, and a movable electrode 562 which is provided on the movable substrate 52. The electrodes 561 and 562 are configured so as to face each other. The fixed electrode 561 and the movable electrode 562 face each other via an interelectrode gap. Here, the electrodes 561 and 562 may be configured to be directly provided on surfaces of the fixed substrate 51 and the movable substrate 52, and may be configured to be provided via another film member.

In the present embodiment, a configuration in which the gap G1 between the reflective films is formed smaller than the interelectrode gap is exemplified, but the gap G1 between the reflective films may be formed greater than the interelectrode gap, in a wavelength range in which light is transmitted by the wavelength variable interference filter 5.

Here, in the filter planar view, one side (for example, side C3-C4 of FIG. 3) of the movable substrate 52 protrudes outward more than side C3'-C4' of the fixed substrate 51. A protrusion section of the movable substrate 52 is an electrical component section 525 that is not bonded to the fixed substrate 51, and a surface to be exposed when the wavelength variable interference filter 5 is viewed from the fixed substrate 51 side becomes an electrical component surface 524 on which electrode pads 564P and 565P to be described later are provided.

Configuration of Fixed Substrate

As illustrated in FIG. 4, an electrode disposition groove 511 and a reflective film installation section 512 are formed by etching in the fixed substrate 51. The fixed substrate 51 has a thickness dimension greater than that of the movable substrate 52, and the fixed substrate 51 is not bent due to an electrostatic attractive force when a voltage is applied between the fixed electrode 561 and the movable electrode 562, or internal stress of the fixed electrode 561.

The electrode disposition groove 511 is formed in a ring shape having a filter center point O of the fixed on on on the substrate 51 as a center in a filter planar view (refer to FIG. 3). A groove bottom surface of the electrode disposition groove 511 becomes an electrode installation surface 511A on which the fixed electrode 561 is disposed.

The reflective film installation section 512 is formed so as to protrude toward the movable substrate 52 from the central portion of the electrode disposition groove 511, in a planar view. A protrusion tip surface of the reflective film installation section 512 becomes a reflective film installation surface 512A.

The fixed electrode 561 which configures the electrostatic actuator 56 is provided on the electrode installation surface 511A. The fixed electrode 561 is provided in an area, which faces the movable electrode 562 of a movable section 521 which will be described later, in the electrode installation surface 511A. In addition, a configuration in which an insulating film for ensuring insulation properties between the fixed electrode 561 and the movable electrode 562 is stacked on the fixed electrode 561 may be adopted.

In addition, as illustrated in FIG. 3, a fixed extraction electrode 563 that is coupled to an outer circumference of the fixed electrode 561 is provided in the fixed substrate 51. The fixed extraction electrode 563 is provided along a coupling electrode groove 511B (refer to FIG. 4) which is formed from the electrode disposition groove 511 toward side C3'-C4' (the electrical component section 525 side). A bump 565A which protrudes toward the movable substrate 52 is provided in the coupling electrode groove 511B, and the fixed extraction electrode 563 extends onto the bump 565A. Thus, the fixed extraction electrode 563 comes into contact with a fixed coupling electrode 565 provided toward the movable substrate 52 on the bump 565A, and is electrically coupled to the fixed coupling electrode 565. The fixed coupling electrode 565 extends to the electrical component surface 524 from an area that faces the coupling electrode groove 511B, and configures the fixed electrode pad 565p in the electrical component surface 524.

The present embodiment illustrates a configuration in which one fixed electrode 561 is provided in the electrode installation surface 511A, but, for example, may have a configuration (dual electrode configuration) in which two electrodes that are configured by a concentric circle having the filter center point O as a center are provided. In addition, a transparent electrode may be provided on the fixed reflective film 54, or a coupling electrode may be formed on a fixed-side electrical component section from the fixed reflective film 54, using the fixed reflective film 54 with conductivity. In this case, the fixed electrode 561 may have a configuration in which a part of the fixed electrode 561 is notched according to a position of the coupling electrode.

As described above, the reflective film installation section 512 is formed in a substantially cylindrical shape with a diameter dimension smaller than that of the electrode disposition groove 511 on the same axis as the electrode disposition groove 511, and includes the reflective film installation surface 512A which faces the movable substrate 52 of the reflective film installation section 512.

As illustrated in FIG. 4, the fixed reflective film 54 is provided on the reflective film installation section 512. A metal film such as Ag, or an alloy film such as Ag alloy are able to use for the fixed reflectictive film 54. In addition, the fixed reflective film 54 may use a dielectric multilayer film which uses $TiO_2$ for a high refractive layer and uses $SiO_2$ for a low refractive layer, for example. Furthermore, a reflective film in which a metal film (or alloy film) is stacked on a dielectric multilayer film, a reflective film in which a dielectric multilayer film is stacked on a metal film (or alloy film), a reflective film in which a refraction layer of a single layer ($TiO_2$, $SiO_2$, or the like) and a metal film (or alloy film) are stacked, or the like may be used for the fixed reflective film.

In addition, an anti-reflective film may be formed at a position corresponding to the fixed reflective film 54 on a light incident surface (a surface on which the fixed reflective film 54 is not provided) of the fixed substrate 51. The anti-reflective film can be formed by alternately stacking low refractive index films and high refractive index films on each other, decreases reflectance of visible light on the surface of the fixed substrate 51, and increases transmittance.

In addition, a surface on which the electrode disposition groove 511, the reflective film installation section 512, and the coupling electrode groove 511B are not formed by etching in a surface which faces the movable substrate 52 of the fixed substrate 51 configures the first bonding section 513. The first bonding film 531 is provided on the first bonding section 513, and the fixed substrate 51 and the movable substrate 52 are bonded together by bonding the first bonding film 531 to the second bonding film 532 provided on the movable substrate 52, as described above.

Configuration of Movable Substrate

The movable substrate 52 includes the movable section 521 of a ring shape having the filter center point O as a center, and a holding section 522 that is on the same axis as the movable section 521 and holds the movable section 521.

The movable section 521 is formed to have a thickness dimension greater than that of the holding section 522. The movable section 521 is formed to have a diameter dimension greater than at least a diameter dimension of the outer circumference of the reflective film installation surface 512A, in a filter planar view. In addition, the movable electrode 562 and the movable reflective film 55 are provided in the movable section 521.

In the same manner as the fixed substrate 51, an anti-reflective film may be formed on a surface opposite to the fixed substrate 51 of the movable section 521. The anti-reflective film can be formed by alternately stacking low refractive index films and high refractive index films to each other, decreases reflectance of visible light on the surface of the movable substrate 52, and increases transmittance.

The movable electrode 562 faces the fixed electrode 561 via a predetermined interelectrode gap, and is formed in a ring shape which is the same shape as the fixed electrode 561. The movable electrode 562 configures the electrostatic actuator 56 together with the fixed electrode 561. In addition, a movable coupling electrode 564 which is coupled to an outer circumference of the movable electrode 562 is provided on the movable substrate 52. The movable coupling electrode 564 is provided across the electrical component surface 524, along to a position which faces the coupling electrode groove 511B provided on the fixed substrate 51, from the movable section 521. The movable coupling electrode 564 configures a movable electrode pad 564P which is electrically coupled to an internal terminal section on the electrical component surface 524.

In addition, as illustrated above, the fixed coupling electrode 565 is provided on the movable substrate 52, and the fixed coupling electrode 565 is coupled to the fixed extraction electrode 563 at a position in which the bump 565A (refer to FIG. 3) is formed.

The movable reflective film 55 is provided so as to face the fixed reflective film 54 via the gap G1 in the central portion of a movable surface 521A of the movable section 521. The movable reflective film 55 uses a reflective film having the same configuration as the fixed reflective film 54 described above.

As described above, the present embodiment is not limited to an example in which the dimension of the interelectrode gap is greater than that of the gap G1 between the reflective films. For example, in a case in which infrared light or far infrared light is used as measurement target light, or the like, the gap G1 may be configured to have a greater dimension than that of the interelectrode gap, depending on a wavelength range of the measurement target light.

The holding section 522 is a diaphragm surrounding the periphery of the movable section 521, and is formed so as to have a thickness dimension smaller than that of the movable section 521. The holding section 522 is bent more easily than the movable section 521, and can displace the movable section 521 toward the fixed substrate 51 according to a slight electrostatic attractive force. At this time, since the movable section 521 has thickness dimension and rigidity greater than those of the holding section 522, deformation of the movable section 521 does not occur, even if the holding section 522 is pulled toward the fixed substrate 51 by an electrostatic attractive force. Thus, the movable reflective film 55 provided in the movable section 521 is not bent, and the fixed reflective film 54 and the movable reflective film 55 can be constantly maintained parallel to each other.

The present embodiment illustrates the holding section 522 of a diaphragm shape, but is not limited to this, and for example, may have a configuration in which the holding section of a beam shape which has the filter center point O as a center and is disposed in an equal angular interval is provided.

In the movable substrate 52, an area which faces the first bonding section 513 becomes the second bonding section 523. As described above, the second bonding film 532 is provided in the second bonding section 523, and the fixed substrate 51 and the movable substrate 52 are bonded together by bonding the second bonding film 532 to the first bonding film 531 as described above.

Configuration of Case

As illustrated in FIG. 2, the case 610 includes a base 620 corresponding to a base section of the invention, and a lid 630, and contains the wavelength variable interference filter 5 thereinside.

The base 620 is a ceramic substrate which is formed by stacking and baking ceramic thin layers. As illustrated in FIG. 1 and FIG. 2, a side wall section 621 which has a frame shape in a planar view is provided on a surface facing the lid 630, in the base 620. In addition, the base 620 has a concave section 622 which is formed so as to be surrounded by the side wall section 621. In addition, the lid 630 is bonded to a lid bonding surface 621A which is a surface on the lid 630 side of the side wall section 621.

The wavelength variable interference filter 5 is fixed by a fixing member 624, to a fixed surface 621B (hereinafter, referred to as a fixed surface 621B) facing a side surface 51A including side C1'-C2' of the fixed substrate 51, in a side surface of the inside of the side wall section 621. As illustrated in FIG. 2, the movable substrate 52 faces a bottom section 622A, in the wavelength variable interference filter 5, and the side surface 51A of the fixed substrate 51 is fixed to the fixed surface 621B, in a state of being separated from the bottom section 622A. A fixing configuration in which the wavelength variable interference filter 5 is fixed to the base 620 will be described in detail later.

A light passing-through hole 628 through which light (or light incident on the wavelength variable interference filter) exited from the wavelength variable interference filter 5 passes is provided in the bottom section 622A of the concave section 622. A light transmitting member 629 such as a glass plate is bonded to the light passing-through hole 628 by a bonding agent such as low-melting glass.

In addition, a sealing hole 622B coupled to the outside of the case 610 is provided in the bottom section 622A of the concave section 622. The sealing hole 622B is a hole, for example, through which gas in the case 610 is suctioned or replaced with inert gas, at the time of manufacturing the optical filter device 600, and can be sealed with a sealing member 622C (refer to FIG. 2) such as Au, in a state in which the inside of the case 610 is vacuum or depressurized.

Furthermore, an internal terminal 622D (refer to FIG. 1) which is coupled to electrode pads 564P and 565P of the wavelength variable interference filter is provided in the bottom section 622A if the concave section 622. For example, a through hole (not illustrated) which is coupled to the outside of the case 610 is provided in a portion in which the internal terminal 622D is formed, and the through hole is filled with a metal member such as Ag which is electrically coupled to the internal terminal 622D. The metal member is coupled to an external terminal (not illustrated) provided in the outside of the base 620, and thereby the internal terminal 622D is electrically coupled to the external terminal.

The lid 630 has an external form of a rectangular shape which is the same as that of the base 620, in the filter planar view, and is formed of glass through which light can transmit. The lid 630 is bonded to the lid bonding surface 621A in a state in which the wavelength variable interference filter 5 is disposed in the base 620. Fixing Configuration of Wavelength Variable Interference Filter As illustrated in FIG. 1 and FIG. 2, a protrusion section 623 is provided on the fixed surface 621B to which the side surface 51A of the wavelength variable interference filter 5 is fixed. A tip 623A of the protrusion section 623 is in contact with the side surface 51A of the fixed substrate 51. The side surface 51A and the fixed surface 621B are separated by a distance specified according to the protrusion section 623, and are fixed by the fixing member 624 provided between the side surface 51A and the fixed surface 621B.

The protrusion section 623 protrudes in a direction orthogonal to the side surface 51A, and toward the side wall section 621 from the fixed surface 621B. The protrusion section 623 is formed in a shape in which a sectional area in a surface direction parallel to the fixed surface 621B decreases as it goes toward the protrusion direction, for example, a substantially hemispherical shape. The protrusion section 623, which is formed of a material that is cured to a solid from liquid, such as a thermosetting resin or a photocurable resin, will be described later.

As illustrated in FIG. 1, a plurality (two in the illustrated example) of the protrusion sections 623 are provided in positions different from each other along to side C1'-C2'. Since each of the plurality of protrusion sections 623 has the tip 623A in contact with the side surface 51A, the wavelength variable interference filter 5 is positioned with respect to the fixed surface 621B.

Here, the protrusion section 623 is formed of a highly elastic material with modulus of elasticity higher than that of the fixing member 624. Thereby, even if a force directed to the fixed surface 621B from the side surface 51A acts on the protrusion section 623 according to cure shrinkage of the fixing member 624, it is possible to prevent the protrusion section 623 from being deformed, as will be described later. Thus, it is possible to prevent a position of the wavelength variable interference filter 5 with respect to the fixed surface 621B from being changed.

The fixing member 624 fixes the side surface 51A to the fixed surface 621B. As illustrated in FIG. 1, the fixing member 624 is provided on the entire surface of the side surface 51A along the side C1'-C2' of the fixed substrate 51. As illustrated in FIG. 2, the wavelength variable interference filter 5 is fixed to the fixed surface 621B by the fixing member 624, in a state in which the movable substrate 52 is directed toward the bottom section 622A. In the present embodiment, a gap is provided between a surface other than the side surface 51A of the wavelength variable interference filter 5 and the base 620. For example, a gap CL1 is provided between a lower surface 52B facing the bottom section 622A of the movable substrate 52 and the bottom section 622A, as illustrated in FIG. 2. A gap is also provided between the fixed substrate 51 and the lid 630.

Here, if a force in a substrate thickness direction due to external disturbance acts on the wavelength variable interference filter 5, vibration (hereinafter, also referred to as filter vibration) occurs along the substrate thickness direction (arrow M of FIG. 2), using the side surface 51A including the side C1'-C2' fixed by the fixing member 624 as a fixed end. The vibration (primary resonance vibration) caused by primary resonance of the wavelength variable interference filter 5 in the filter vibration has the largest amplitude in an end portion (free end) of a side surface 52A of the movable substrate 52 farthest away from the side surface 51A on a fixed end side, in the filter planar view. The filter vibration may also be induced by reaction in addition to external disturbance, when the movable section 521 is moved by driving of the electrostatic actuator 56.

In the present embodiment, a dimension h1 (when the wavelength variable interference filter 5 stops) of the gap CL1 between the lower surface 52B and the bottom section 622A in the substrate thickness direction (arrow M direction of FIG. 2) is set so as to be larger than a maximum amplitude (amplitude of primary resonance vibration) of a lower end (intersection between the side surface 52A and the lower surface 52B) of the side surface 52A that is a free end, even if filter vibration occurs. For example, if a dimension of the fixed substrate 51 is approximately 10 mm and the maximum amplitude is several μm, the dimension h1 of the gap CL1 is set to several μm or more (for example, 20 μm or more). Accordingly, even if the filter vibration occurs, it is possible to prevent the movable substrate 52 from coming into contact with the bottom section 622A.

When the filter vibration occurs, the maximum amplitude of the lower surface 52B of the side surface 52A is changed depending on the dimension of the wavelength variable interference filter 5, modulus of elasticity of the respective substrates 51 and 52 and the fixing member 624, external disturbance vibration, or the like, and may be acquired by simulation, experiment, or the like.

In addition, in the present embodiment, the fixing member 624 has modulus of elasticity (for example, 500 MPa or less) which can be elastically deformed by receiving stress from the wavelength variable interference filter 5 that rotates according to the filter vibration by using the side surface 51A as a fixed end. In this way, as the fixing member 624 is elastically deformed, it is possible to absorb the filter vibration, and to prevent resolution of the wavelength variable interference filter 5 from decreasing because the dimension of the gap G1 is changed by influence of the filter vibration.

Here, in the fixing member 624, the lower the modulus of elasticity is, the smaller the fixing force is. That is, by decreasing the modulus of elasticity of the fixing member 624, the filter vibration due to elastic deformation can be prevented, but the fixing force decreases and thereby the wavelength variable interference filter 5 may drop out. For this reason, the minimum value of the modulus of elasticity is set to a value sufficient enough to obtain a fixing force which can prevent the wavelength variable interference filter 5 from dropping out according to a mass, a dimension, or the like of the wavelength variable interference filter 5. Meanwhile, a maximum value of the modulus of elasticity is set to a value which allows elastic deformation according to the filter vibration, in the same manner as above.

For example, a silicone-based adhesive can be used as the fixing member 624. In addition, it is preferable that the modulus of elasticity of the fixing member 624 is, for example, 10 MPa to 500 MPa. It is more preferable that the modulus of elasticity of the fixing member 624 is 50 MPa to 100 MPa. Accordingly, it is possible to prevent the wavelength variable interference filter 5 from dropping out, and to efficiently prevent the filter vibration.

Method of Manufacturing Optical Filter Device

Subsequently, a method of manufacturing the aforementioned optical filter device 600 will be described with reference to the accompanying drawings.

FIG. 5 is a process diagram illustrating an example of a manufacturing process of the optical filter device 600.

Figure 6A:
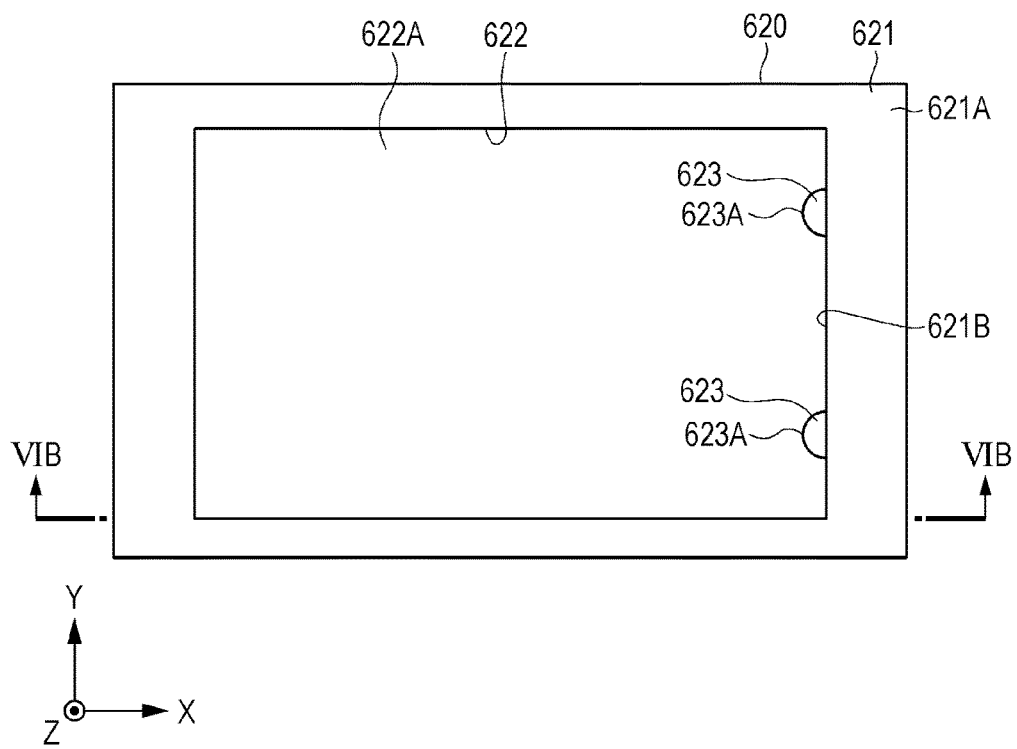
FIG. 6A and FIG. 6B are views schematically illustrating a base and the wavelength variable interference filter in a filter fixing process.

In addition, FIG. 6A to FIG. 10 schematically illustrate members such as the wavelength variable interference filter 5 and the base 620 in a device manufacturing process illustrated in FIG. 5. FIG. 6A is a top view when the base 620 is viewed in a direction toward the bottom section 622A, FIG. 6B is a sectional view illustrating a cut surface which is obtained by cutting along line VIB-VIB of FIG. 6A, and the same is applied to FIG. 7A to FIG. 9B.

Here, in the following description, a direction orthogonal to the bottom section 622A is referred to as a Z direction, a direction orthogonal to the Z direction and to the fixed surface 621B is referred to as an X direction, and a direction orthogonal to the X direction and the Z direction is referred to as a Y direction. In addition, a direction which uses the bottom section 622A as a reference point and is separated from the base 620 is referred to as +Z direction.

Figure 8A:
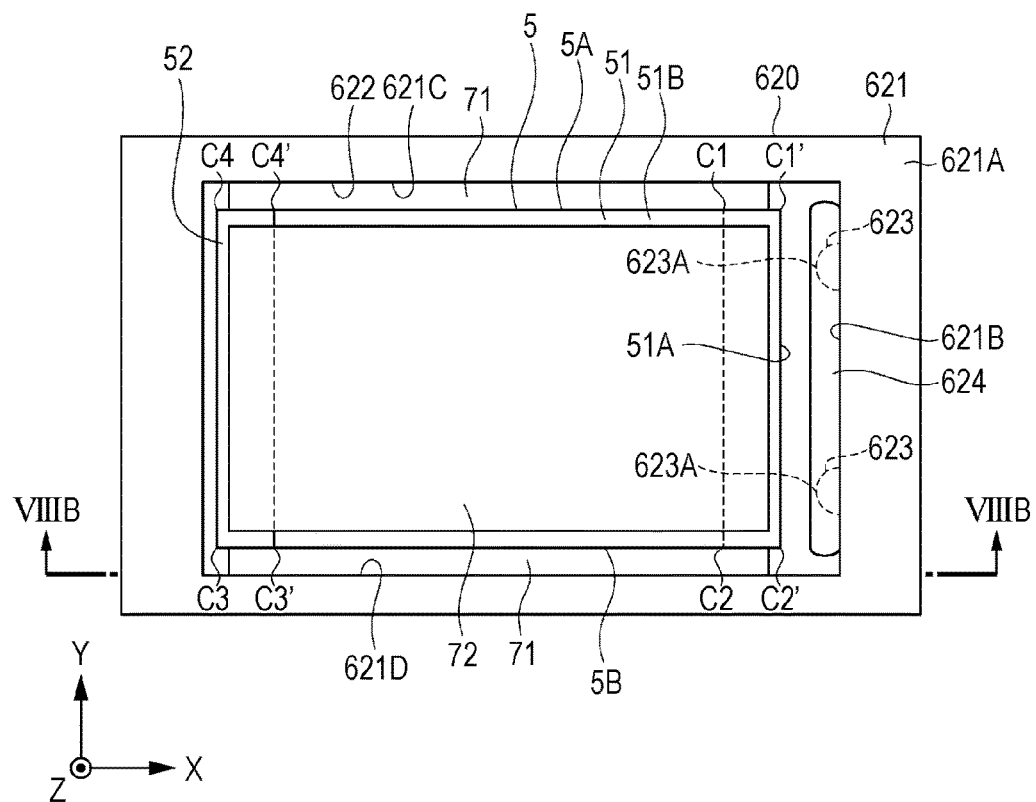
FIG. 8A and FIG. 8B are views schematically illustrating the base and the wavelength variable interference filter in the filter fixing process.
Figure 8B:
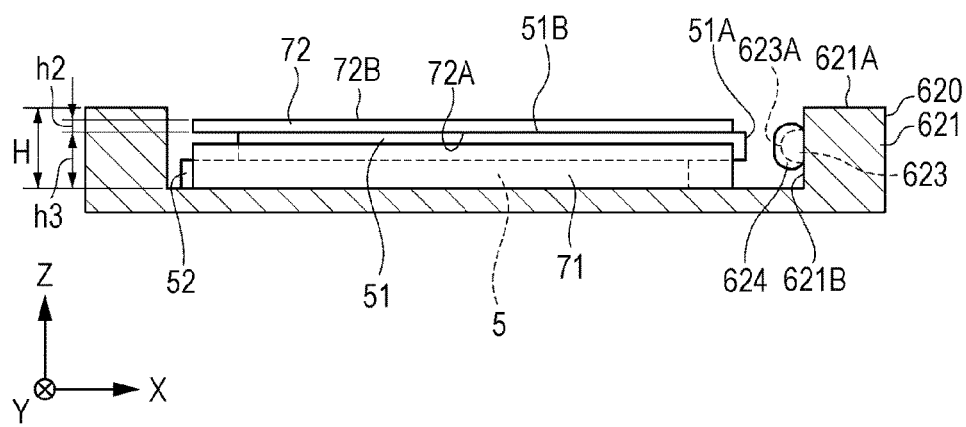
Figure 9A:
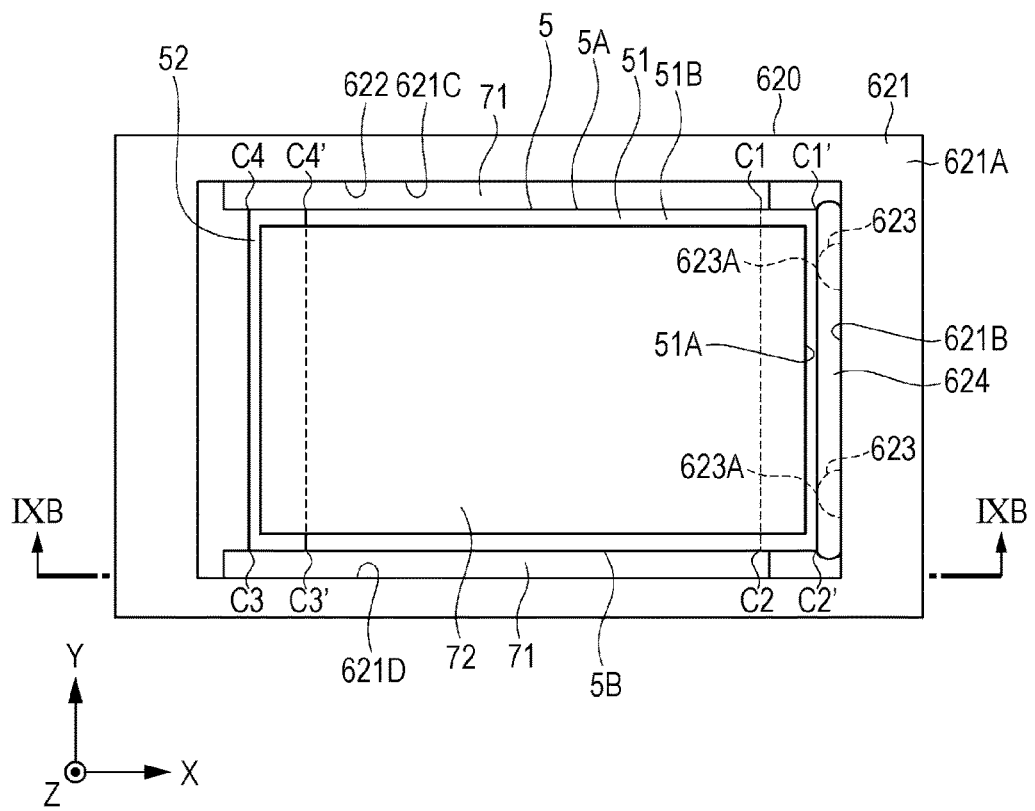
FIG. 9A and FIG. 9B are views schematically illustrating the base and the wavelength variable interference filter in the filter fixing process.
Figure 9B:
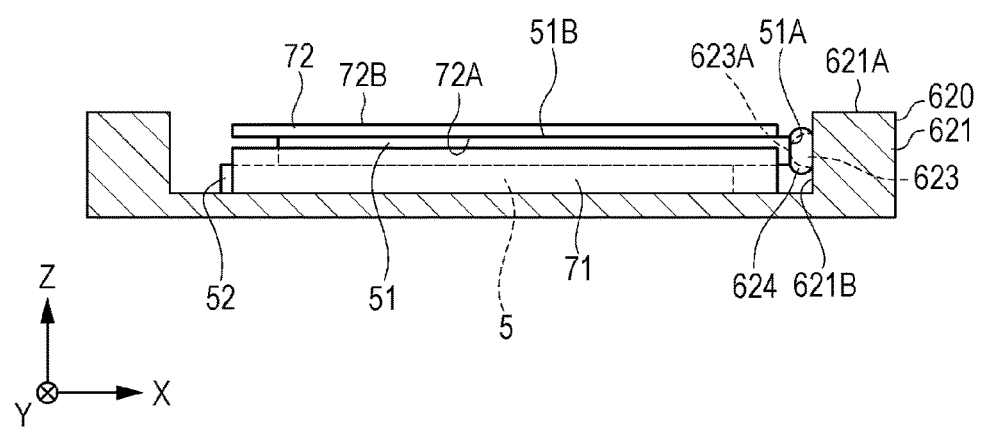
Figure 10:
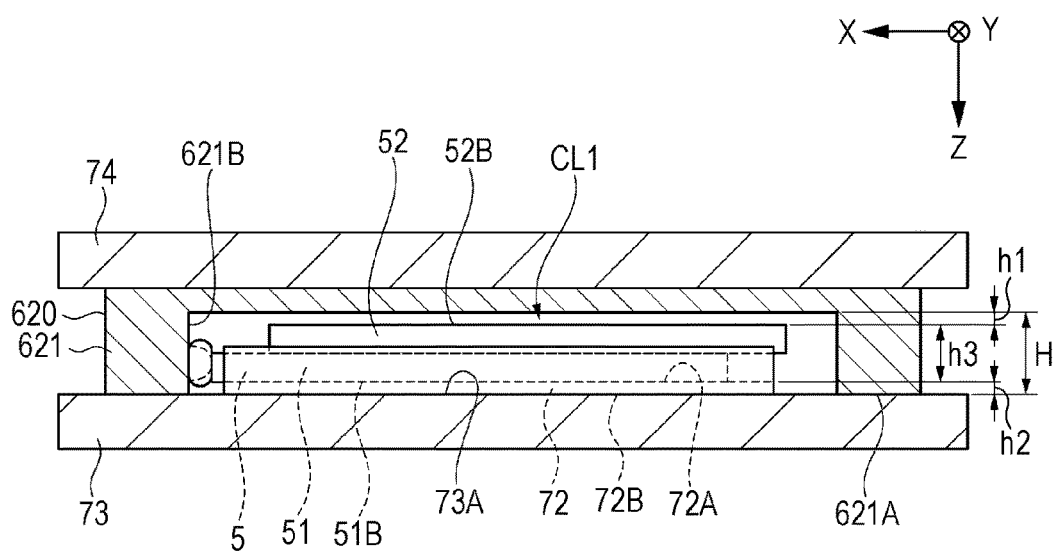
FIG. 10 is a view schematically illustrating the base and the wavelength variable interference filter in the filter fixing process.

In addition, FIG. 6A to FIG. 9B illustrate a state in which the base 620 is disposed such that the Z direction is aligned in parallel to a vertical direction and in a direction from the bottom to the top. Meanwhile, FIG. 10 illustrates a state in which the base 620 is disposed such that the Z direction is aligned in the vertical direction.

As illustrated in FIG. 5, in a process of manufacturing the optical filter device 600, a filter preparation process (S1) in which the wavelength variable interference filter 5 configuring the optical filter device 600 is manufactured, a base preparation process (S2) in which the base 620 is prepared, and a lid preparation process (S3) in which the lid 630 is prepared, are respectively performed, and thereafter a device assembly process (S4) in which the optical filter device 600 is assembled by using the wavelength variable interference filter 5, the base 620, and the lid 630 is performed.

Filter Preparation Process

In the filter preparation process S1, the fixed substrate 51 and the movable substrate 52 are first formed by appropriate etching processing or the like. Then, in the fixed substrate 51, the fixed electrode 561 and the fixed extraction electrode 563 are formed, and thereafter the fixed reflective film 54 is formed. In addition, in the movable substrate 52, the movable electrode 562, the movable coupling electrode 564, the fixed coupling electrode 565, and the respective electrode pads 564P and 565P are formed, and thereafter the movable reflective film 55 is formed. Thereafter, the fixed substrate 51 and the movable substrate 52 are bonded together via the bonding film 53, and thereby the wavelength variable interference filter 5 is obtained.

Base Preparation Process

In the base preparation process S2, an external form of the base 620 is first formed. Specifically, first of all, cutting processing, laser processing, or the like is appropriately performed for a substrate on which sheets as a material for forming a ceramic substrate are stacked and which is not baked, and a shape of the base 620 including the concave section 622 or the light passing-through hole 628 is formed. Then, by baking the substrate which is not baked, the base 620 is formed.

Thereafter, while not being illustrated, a through hole (not illustrated) for electrically coupling the internal terminal 622D to an external terminal (not illustrated) is formed in the bottom section 622A, and the formed through hole is filled with a conductive member. Then, the internal terminal 622D and the external terminal are formed.

Lid Preparation Process

In the lid preparation process S3, a glass plate with a predetermined thickness is divided into parts of the same rectangular shape as the base 620, and a plurality of lids 630 are simultaneously formed.

Device Assembly Process

In the device assembly process S4, the wavelength variable interference filter 5 is fixed to the base 620, and thereafter the optical filter device 600 is formed by bonding the lid 630 to the base 620.

In the device assembly process S4, a protrusion section forming process is performed in which the protrusion section 623 is formed on the fixed surface 621B of the concave section 622 of the base 620 (S41).

Figure 6B:
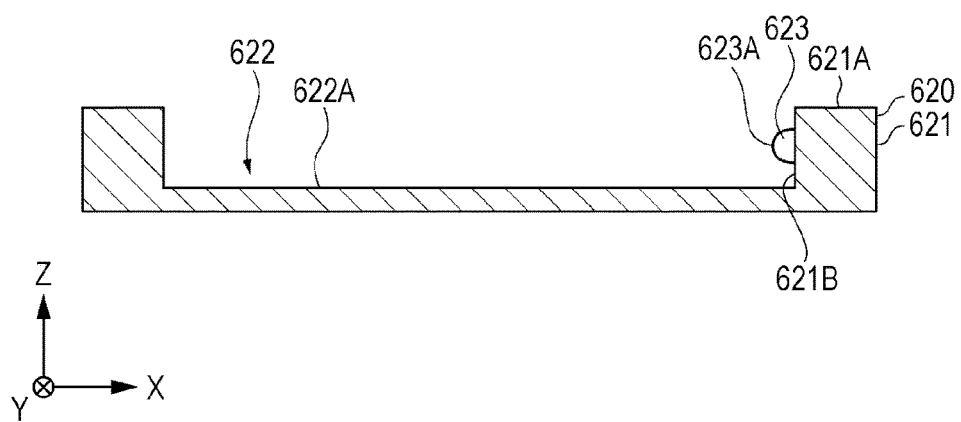

As illustrated in FIGS. 6A and 6B, in the present embodiment, a position at which the wavelength variable interference filter 5 is fixed, of the fixed surface 621B is coated with a liquid curable material such as a thermosetting resin or photocurable resin, and is cured. Thereby the fixed surface 621B is formed. That is, if the fixed surface 621B is coated with the liquid curable material, the liquid curable material has a substantially hemispherical shape caused by surface tension. The curable material having the substantially hemispherical shape is cured. The protrusion section 623 formed by doing so has an approximately hemispherical shape in which the farther a cut surface is from the fixed surface 621B, the smaller an area of the cut surface parallel to the fixed surface 621B is. A shape or a size of the protrusion section 623 can be adjusted by viscosity of the curable material or a coating amount.

Subsequently, a fixing member coating process is performed in which a position at which the wavelength variable interference filter 5 is fixed, of the fixed surface 621B is coated with the fixing member 624 (S42).

Figure 7A:
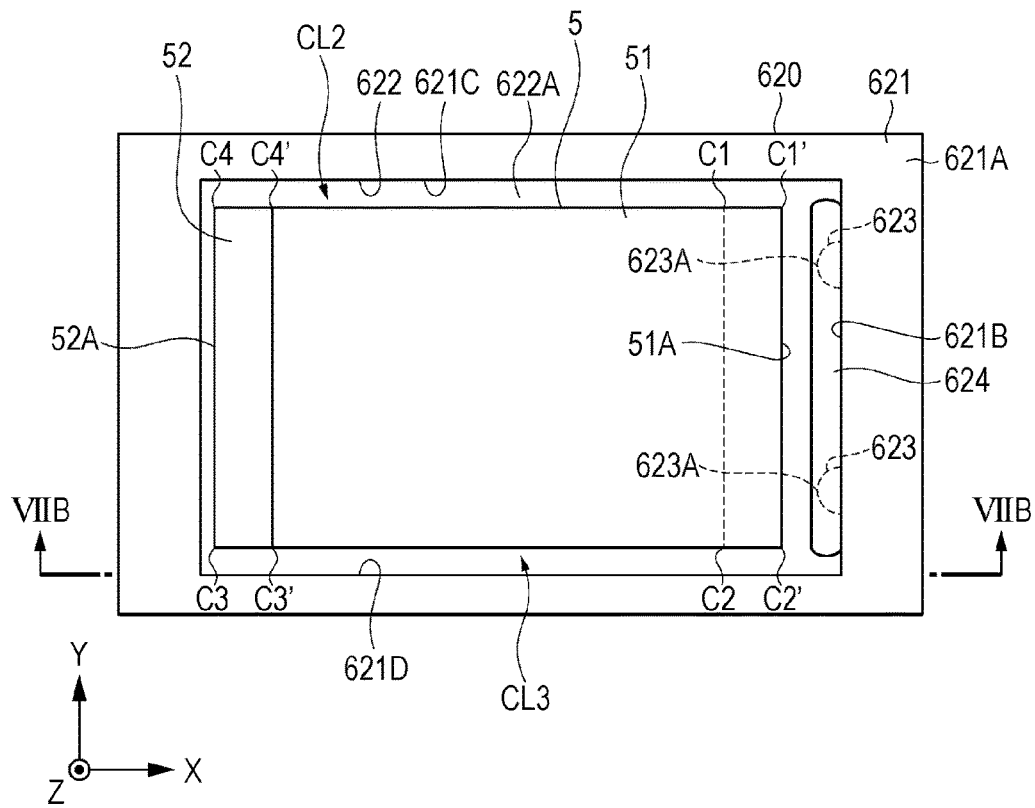
FIG. 7A and FIG. 7B are views schematically illustrating the base and the wavelength variable interference filter in the filter fixing process.
Figure 7B:
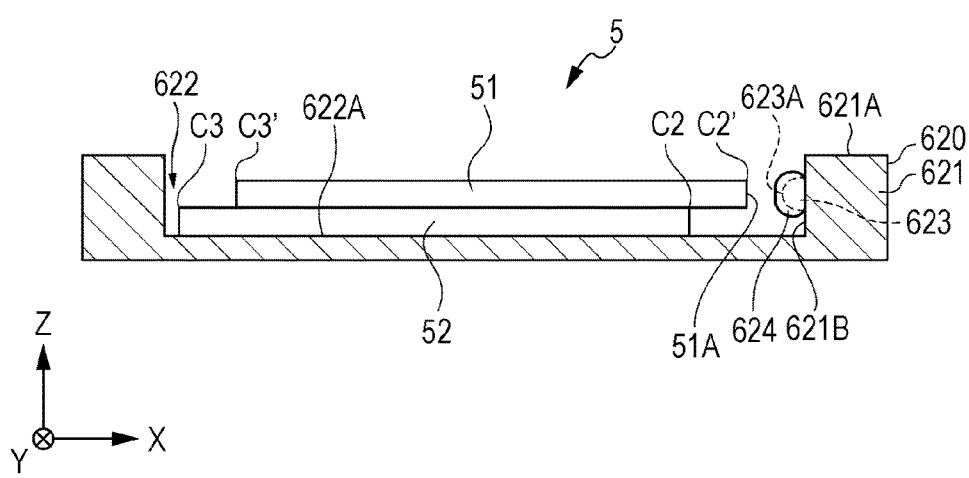

As illustrated in FIGS. 7A and 7B, the fixed surface 621B is coated with a coating amount of the fixing member 624, in such a manner that the dimension of the fixing member 624 in a direction orthogonal to the fixed surface 621B is greater than the dimension of the protrusion section 623. Accordingly, the side surface 51A of the wavelength variable interference filter 5 can come into contact with the fixing member 624, before coming into contact with the tip 623A of the protrusion section 623, and thus it is possible to prevent bonding failure due to the fact that the side surface 51A is not in contact with the fixing member 624.

Subsequently, a filter fixing process is performed in which the wavelength variable interference filter 5 is fixed to a fixed position (S43).

In the filter fixing process S43, the wavelength variable interference filter 5 is disposed in the bottom section 622A so as to not be in contact with the fixing member 624 (refer to FIGS. 7A and 7B), and in a state in which the wavelength variable interference filter 5 is separated from the bottom section 622A, the side surface 51A of the wavelength variable interference filter 5 comes into contact with the tip 623A of the protrusion section 623, and thereby the wavelength variable interference filter 5 is fixed to the base 620.

Specifically, as illustrated in FIGS. 8A and 8B, one guide member 71 is disposed in a gap CL2 (refer to FIGS. 7A and 7B) between an end surface 5A including side C1-C4 of the wavelength variable interference filter 5 and an internal surface 621C of the side wall section 621 which faces the end surface 5A. In the same manner as this, the other guide member 71 is disposed in a gap CL3 (refer to FIGS. 7A and 7B) between an end surface 5B including sides C2-C3 of the wavelength variable interference filter 5 and an internal surface 621D of the base 620 which faces the end surface 5B. In addition, a positioning member 72 is disposed on a surface on a side opposite to the bottom section 622A of the wavelength variable interference filter 5, that is, on an upper surface 51B of the fixed substrate 51.

The guide member 71 restricts a moving direction of the wavelength variable interference filter 5, and moves in the X direction orthogonal to the fixed surface 621B. The guide member 71 is a member of a plate shape whose thickness dimension is substantially the same as a dimension of the gap CL2 in the Y direction orthogonal to the end surface 5B, and is formed of glass or the like. In a state in which the guide member 71 is inserted in the gap CL2, the wavelength variable interference filter 5 moves in the X direction along a surface of the guide member 71.

As described below, the positioning member 72 performs positioning of the Z direction of the wavelength variable interference filter 5, and sets the dimension h1 (refer to FIG. 2) of the gap CL1 to a desired value. The positioning member 72 has a plate shape and is formed of glass or the like. The positioning member 72 includes a filter contact surface 72A in contact with the wavelength variable interference filter 5, and an upper surface 72B on a side opposite to the filter contact surface 72A. In a state in which the positioning member 72 is disposed on the wavelength variable interference filter 5, the filter contact surface 72A and the upper surface 72B are orthogonal to the Z direction.

Here, a thickness dimension h2 of the positioning member 72 in the Z direction is set in such a manner that the dimension h1 of the gap CL1 becomes the desired value described above, with respect to a depth dimension H of the concave section 622 and the thickness dimension h3 of the wavelength variable interference filter 5. That is, the thickness dimension h2 of the positioning member 72 may be set in such a manner that the sum of the dimensions h1, h2, and h3 becomes the depth dimension H of the concave section 622.

As illustrated in FIGS. 8A and 8B, in a state in which the guide member 71 and the positioning member 72 are disposed, the wavelength variable interference filter 5 moves toward the protrusion section 623 in the X direction. The wavelength variable interference filter 5 moves in the X direction, and the side surface 51A comes into contact with the tip 623A of the protrusion section 623, as illustrated in FIGS. 9A and 9B. At this time, the fixing member 624 comes into close contact with the entire surface of the side surface 51A.

Here, the guide member 71 is disposed so as to be in contact with each of a pair of end surfaces 5A and 5B orthogonal to the Y direction of the wavelength variable interference filter 5. Accordingly, when the wavelength variable interference filter 5 moves in the X direction, it is possible to prevent a position in the Y direction from changing.

Subsequently, as illustrated in FIG. 10, the base 620 is interposed in the Z direction between both sides of a first interposing member 73 in contact with the lid bonding surface 621A and a second interposing member 74 in contact with the base 620 on a reverse side of the first interposing member 73 in the Z direction, and performs positioning of the Z direction of the wavelength variable interference filter 5, by reversing the top and the bottom in such a manner that the +Z direction becomes a direction which directs toward bottom from top of the vertical direction.

That is, if the top and the bottom of the base 620 are reverse to each other, the wavelength variable interference filter 5 and the positioning member 72 move in the +Z direction (downward). Thus, the upper surface 72B of the positioning member 72 comes into contact with a contact plane 73A (a surface orthogonal to the Z direction) in contact with the lid bonding surface 621A of the first interposing member 73, and the wavelength variable interference filter 5 is positioned in the Z direction.

As described above, the depth dimension H of the concave section 622, the dimension h1 of the gap CL1, the thickness dimension h2 of the positioning member 72, and the thickness dimension h3 of the wavelength variable interference filter 5 are set in such a manner that the dimension h1 becomes a desired value, and thus the gap CL1 with a desired dimension h1 is provided between the lower surface 52B of the movable substrate 52 and the bottom section 622A.

In addition, in a state in which the wavelength variable interference filter 5 is positioned, the fixing member 624 is cured, and thereby the side surface 51A of the wavelength variable interference filter 5 and the fixed surface 621B of the base 620 are fixed together by the fixing member 624. After the fixing member 624 is cured, the guide member 71 and the positioning member 72 are removed. By doing so, one place on substantially the entire surface of the side surface 51A of the wavelength variable interference filter 5 is fixed to the base 620. Thus, a gap is provided between the surface other than the side surface 51A of the wavelength variable interference filter 5 and the base 620 (refer to FIG. 1 and FIG. 2). That is, a region which is exposed to the outside of the surfaces of the fixed substrate 51 and the movable substrate 52, and the base 620 are disposed with a gap therebetween.

A distance between the upper surface 51B of the fixed substrate 51 and the lid 630 is equal to or greater than the dimension h2 (strictly, the sum of the dimension h2 and the thickness dimension of the bonding member). Thus, a minimum value of the distance between the upper surface 51B and the lid 630 can be specified by the dimension h2. For example, in the same manner as the dimension h1, the dimension h2 is set so as to be greater than the maximum amplitude of an upper end on the free end side on a side opposite to the side surface 51A that is a fixed end of the fixed substrate 51, and thus it is possible to prevent the upper surface 51B from coming into contact with the lid 630.

Subsequently, a wire bonding process is performed (S44). In the process S44, the respective electrode pads 564P and 565P of the wavelength variable interference filter 5 are respectively coupled to each of the internal terminals 622D by wires by using wire bonding.

Thereafter, a lid bonding process is performed in which the base 620 and the lid 630 are bonded together (S45). The light transmitting member 629 is bonded to a position, which covers the light passing-through hole 628, together with the bonding of the lid 630. In the process S45, for example, the base 620, the light transmitting member 629, and the lid 630 are bonded together under an environment which is set to a vacuum atmosphere, in a vacuum chamber device or the like.

As described above, the optical filter device 600 is manufactured.

Effects of Embodiment

In the present embodiment, one place on the fixed substrate 51 of the wavelength variable interference filter 5 is fixed to the base 620 by the fixing member 624. Thus, the other place of the wavelength variable interference filter 5 other than the place fixed by the fixing member 624, and the base 620 are disposed with the gap therebetween (gap CL1).

Here, in a case in which one place on the fixed substrate 51 is fixed, the filter vibration may occur due to an influence of external disturbance, as described above.

In the present embodiment, since one place on the side surface 51A of the wavelength variable interference filter 5 is fixed by the fixing member 624, a gap CL1 is provided between a place other than the place fixed by the fixing member 624, and the base 620, and the other place is not contact with the base 620. For this reason, it is possible to prevent vibration due to external disturbance from transmitting to the respective substrates 51 and 52 from the base 620, and to prevent the filter vibration due to the influence of the external disturbance from occurring. Thus, it is possible to prevent distortion of the respective substrates 51 and 52 due to the filter vibration from occurring, and to prevent resolution of the wavelength variable interference filter 5 from decreasing.

In the present embodiment, the fixing member fixes one place on the side surface along the thickness direction of the substrate.

Normally, rigidity (resistance against bending) with respect to the thickness direction of the fixed substrate 51 is less than rigidity with respect to a plane direction. For this reason, as described above, the fixing member 624 is provided in one place on the side surface 51A, and thereby a direction of stress from the fixing member 624 can be changed to a plane direction along to the side surface 51A. Thus, it is possible to prevent distortion of the fixed substrate 51 due to the stress from the fixing member 624 from occurring, and to prevent resolution of the wavelength variable interference filter 5 from decreasing.

In the present embodiment, the fixing member 624 is provided along the side C1'-C2' orthogonal to the thickness direction of the side surface 51A. In the configuration, for example, the fixing member 624 can be provided in substantially the entire surface of the side surface 51A, and a fixed area can be increased compared to a case in which one place on the side surface 51A is fixed by the fixing member 624. Accordingly, even if the modulus of elasticity of the fixing member 624 decreases, it is possible to increase a fixing force of the fixing member 624 to a value equal to or greater than a desired value, and to prevent the fixed substrate 51 from dropping out.

In the present embodiment, the fixing member 624 is elastically deformed by stress according to rotation of the substrate which arises the side surface 51A as a fixed end.

Here, in the configuration in which one place on the side surface 51A of the fixed substrate 51 is fixed, the filter vibration due to the influence of an external disturbance may occur, as described above. In this case, stress which rotates by using a fixed position as a fixed end (reference point) can act on the fixing member 624 or the fixed substrate 51.

In contrast to this, in the present embodiment, the fixing member 624 is formed of a low elastic material which is elastically deformed by the stress. For this reason, even if a force which induces the filter vibration acts on the optical filter device 600 or the wavelength variable interference filter 5, it is possible to prevent the filter vibration due to an elastic deformation of the fixing member 624 from continuing.

In addition, in the present embodiment, the movable section 521 is driven by the electrostatic actuator 56 that is a gap change section. As described above, the filter vibration may be induced to the wavelength variable interference filter 5 according to driving of the movable section 521.

In contrast to this, in the present embodiment, even if the filter vibration occurs, the fixing member 624 is elastically deformed, and thereby it is possible to suitably prevent the filter vibration from continuing. In addition, the gap CL1 is provided, and thereby it is possible to prevent the wavelength variable interference filter 5 from coming into contact with the base 620, and to prevent the wavelength variable interference filter 5 from degrading or dropping out due to impact of contact.

In the present embodiment, the protrusion section 623 protrudes toward the side surface 51A from the fixed surface 621B of the base 620, and comes into contact with the side surface 51A.

In the configuration, a distance between the side surface 51A and the fixed surface 621B can be specified by a dimension in a protrusion direction of the protrusion section 623, and the fixed substrate 51 is positioned and fixed to the base 620, while separating the side surface 51A from the fixed surface 621B.

In the present embodiment, a plurality of the protrusion sections 623 are provided, and each has a curved shape in which a sectional area in a direction along the fixed surface 621B decreases as it goes toward the protrusion direction.

In the configuration, a contact area between the side surface 51A and the protrusion section 623 decreases, and thereby it is possible to more reliably prevent the vibration due to external disturbance from being transmitted to the fixed substrate 51 from the base 620. In addition, the wavelength variable interference filter 5 is in contact with the plurality of the protrusion sections 623, and thus it is possible to increase positioning accuracy while reducing the contact area.

In the embodiment, the protrusion section 623 is provided in the fixed surface 621B of the base 620, and is formed of a material with modulus of elasticity higher than that of the fixing member 624.

In the configuration, for example, a material, which is cured to a solid from liquid, such as a thermosetting resin, or a photocurable resin is applied to the fixed surface 621B to be cured, and thus the protrusion section 623 can be easily formed. In addition, the stress at the time of cure shrinkage of the material forming the protrusion section 623 does not act on the wavelength variable interference filter 5, and thus distortion due to cure shrinkage does not occur, and it is possible to prevent resolution of the wavelength variable interference filter 5 from decreasing by providing the protrusion section 623. In addition, even if the protrusion section 623 is formed by using a material (for example, epoxy resin or the like) with high elasticity, it is possible to prevent distortion of the wavelength variable interference filter 5 due to cure shrinkage from occurring.

Here, in the present embodiment, the wavelength variable interference filter 5 is fixed to the base 620 by using a low elastic material such as silicone-based adhesive, as the fixing member 624. Accordingly, even if a difference occurs in an amount of expansion (or an amount of contraction) due to a thermal expansion coefficient difference between the respective substrates 51 and 52 of the wavelength variable interference filter 5 and the base 620, it is possible to deform the fixing member 624, and to prevent the fixed substrate 51 from being bent by the stress which acts on the fixed substrate 51 due to the thermal expansion coefficient difference.

In addition, a low elastic material with modulus of elasticity lower than that of the protrusion section 623 is used as the fixing member 624. For example, if a silicone-based adhesive is used as the fixing member 624, an epoxy resin can be used as the protrusion section 623. Accordingly, even if the stress in the +X direction acts on the wavelength variable interference filter 5 and the protrusion section 623 is pressed in the X direction because of the cure shrinkage of the fixing member 624, it is possible to prevent the protrusion section 623 from being deformed, and to prevent the position of the wavelength variable interference filter 5 from being shifted.

In addition, in a state in which the position of the wavelength variable interference filter 5 in the X direction is restricted by the protrusion section 623, even if the cure shrinkage of the fixing member 624 occurs, it is possible to elastically deform the fixing member 624, and to prevent the wavelength variable interference filter 5 from dropping out, by using a low elastic material as the fixing member 624.

Second Embodiment

Subsequently, a second embodiment according to the invention will be described with reference to the accompanying drawings.

In the second embodiment, a color measurement sensor 3 that is an optical module into which the optical filter device 600 according to the first embodiment is incorporated, and a color measurement device 1 that is an electronic apparatus into which the optical filter device 600 is incorporated will be described.

Schematic Configuration of Color Measurement Device

Figure 11:
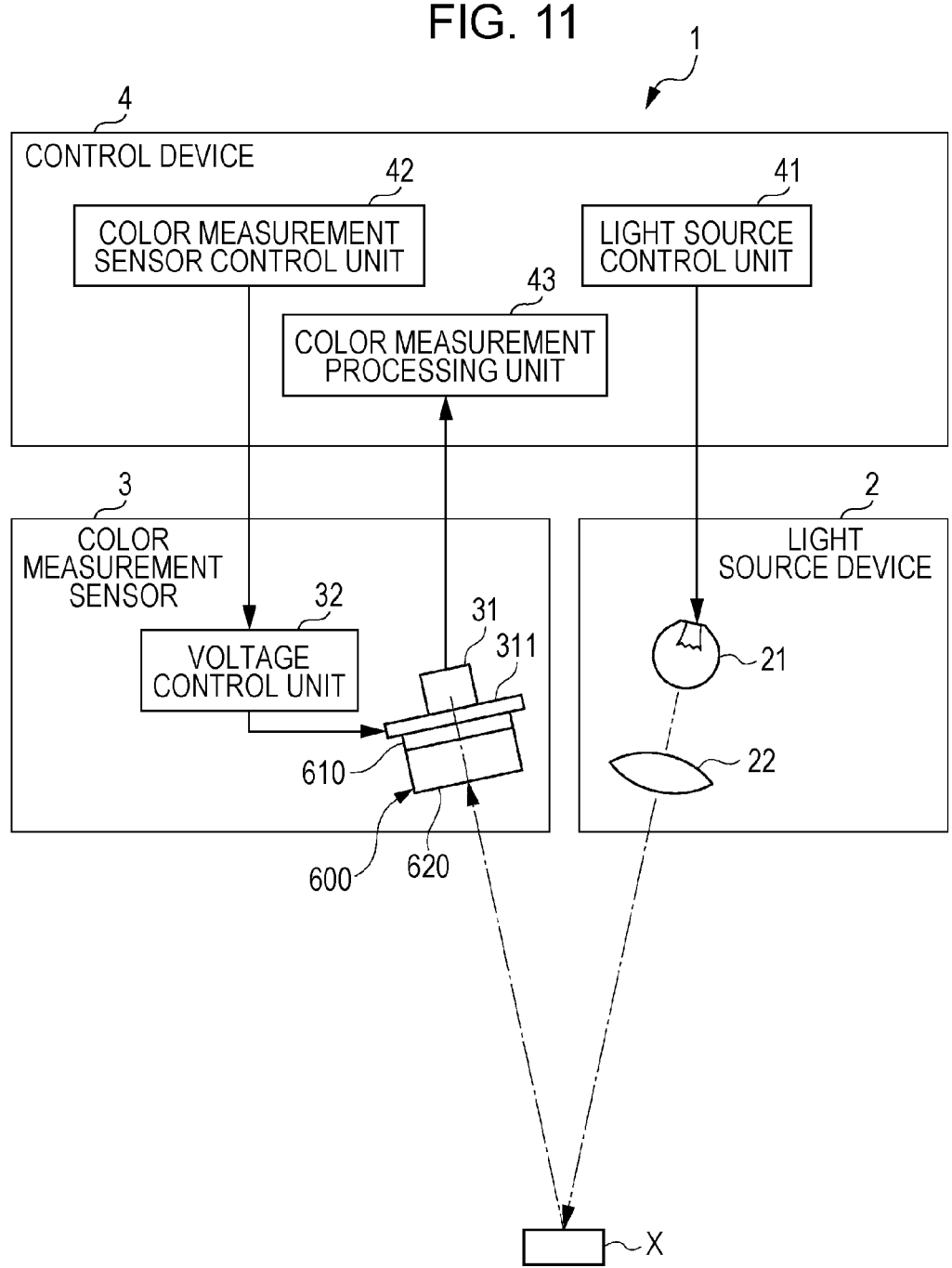
FIG. 11 is a block diagram illustrating a schematic configuration of a color measurement device according to a second embodiment of the invention.

FIG. 11 is a block diagram illustrating a schematic configuration of the color measurement device 1.

The color measurement device 1 is an electronic apparatus according to the invention. As illustrated in FIG. 11, the color measurement device 1 includes a light source device 2 which emits light to an inspection object X, the color measurement sensor 3, and a control device 4 which controls the entire operation of the color measurement device 1. In the color measurement device 1, the color measurement sensor 3 receives inspection object light which is emitted from the light source device 2 and is reflected by the inspection object X. The color measurement device 1 analyzes and measures chromaticity of the inspection object light, that is, colors of the inspection object X, based on a detection signal which is output from the color measurement sensor 3 that receives light.

Configuration of Light Source Device

The light source device 2 includes a light source 21, and a plurality of lenses 22 (only one lens is illustrated in FIG. 11), and emits white light to the inspection object X. In addition, a collimator lens may be included in the plurality of lenses 22, and in this case, the light source device 2 changes the white light emitted from the light source 21 into parallel light using the collimator lens, and emits the parallel light toward the inspection object X from a projection lens which is not illustrated. The present embodiment exemplifies the color measurement device 1 which includes the light source device 2, but may have a configuration in which the light source device 2 is not provided, for example, in a case in which the inspection object X is a light emitting member such as a liquid crystal panel.

Configuration of Color Measurement Sensor

The color measurement sensor 3 configures an optical module according to the invention, and includes the optical filter device 600 according to the first embodiment. As illustrated in FIG. 11, the color measurement sensor 3 includes the optical filter device 600, a detection unit 31 which receives light that is transmitted through the optical filter device 600, and a voltage control unit 32 which changes a wavelength of the light that is transmitted through the wavelength variable interference filter 5.

In addition, the color measurement sensor 3 includes an incident optical lens which guides reflection light (inspection object light) that is reflected by the inspection object X into the inside thereof and is not illustrated, at a position which faces the wavelength variable interference filter 5. The color measurement sensor 3 divides light with a predetermined wavelength, among the inspection object light which is incident from the incident optical lens, using the wavelength variable interference filter 5 in the optical filter device 600, and the detection unit 31 receives the divided light beams.

The detection unit 31 is configured with a plurality of photoelectric exchange elements, and generates an electric signal according to an amount of received light. The detection unit 31 is coupled to the control device 4 via, for example, a circuit substrate 311, and outputs the generated electric signal to the control device 4 as a received light signal.

In addition, an external terminal which is formed on an external surface of the case 610 is coupled to the circuit substrate 311, and is coupled to the voltage control unit 32 via a circuit which is formed in the circuit substrate 311.

In the configuration, the optical filter device 600 and the detection unit 31 can be integrally configured via the circuit substrate 311, and a configuration of the color measurement sensor 3 can be simplified.

The voltage control unit 32 is coupled to the external terminal of the optical filter device 600 via the circuit substrate 311. The voltage control unit 32 applies a predetermined step voltage to the electrode pads 564P and 565P, based on a control signal which is input from the control device 4, and thereby drives the electrostatic actuator 56. Accordingly, an electrostatic attractive force is generated in an interelectrode gap, the holding section 522 is bent, and thereby the movable section 521 is displaced toward the fixed substrate 51, and the gap G1 between the reflective films can be set to a desired dimension.

Configuration of Control Device

The control device 4 corresponds to a processing unit according to the invention, and controls the entire operation of the color measurement device 1.

For example, a general personal computer, a portable information terminal, a color measurement dedicated computer, or the like are able to use for the control device 4.

As illustrated in FIG. 11, the control device 4 is configured to include a light source control unit 41, a color measurement sensor control unit 42, a color measurement processing unit 43, or the like.

The light source control unit 41 is coupled to the light source device 2. The light source control unit 41 outputs a predetermined control signal to the light source device 2, based on, for example, a set input of a user, and causes the light source device 2 to emit white light with predetermined brightness.

The color measurement sensor control unit 42 is coupled to the color measurement sensor 3. The color measurement sensor control unit 42 sets a wavelength of the light which is received by the color measurement sensor 3, based on, for example, a set input of a user, and outputs a control signal indicating that an amount of received light with the wavelength is detected, to the color measurement sensor 3. Accordingly, the voltage control unit 32 of the color measurement sensor 3 sets an application voltage to the electrostatic actuator 56, based on the control signal, in such a manner that only the wavelength of the light that a user desires is transmitted.

The color measurement processing unit 43 analyzes the chromaticity of the inspection object X based on an amount of received light which is detected by the detection unit 31.

Effects of Second Embodiment

The color measurement device 1 according to the present embodiment includes the optical filter device 600 according to the first embodiment. As described above, the optical filter device 600 can reduce bending or warpage of the movable substrate 52 at the time of bonding, and can accurately emit the light with a desired wavelength from the wavelength variable interference filter 5.

Thus, the color measurement sensor 3 that is an optical module can accurately detect an amount of light with a desired wavelength using the detection unit 31. Accordingly, the color measurement device 1 that is an electronic apparatus can control the wavelength variable interference filter 5 of the optical filter device 600, and thus, accurate color measurement processing with respect to the inspection object X can be performed.

Modification of Embodiment

The invention is not limited to the embodiment described above, and modifications, improvements, or the like within a range in which the object of the invention can be achieved are included in the invention.

The respective embodiments exemplify a configuration in which the entire surface of the side surface 51A of the fixed substrate 51 of the wavelength variable interference filter 5 is fixed, but the invention is not limited to this. For example, the embodiment may have a configuration in which a portion of the side surface 51A of the fixed substrate 51 is fixed at one place. In this case, it is possible to reduce the fixed area, and to prevent the distortion of the fixed substrate 51 due to the stress from the fixing member 624 from occurring.

In addition, the invention is not limited to the side surface 51A, and one place of the side surface including side C1'-C4' of the fixed substrate 51, or one place of the side surface including side C2'-C3' of the fixed substrate 51 may be fixed. In addition, the invention is not limited to the side surface, and a portion of the lower surface 52B of the movable substrate which faces the bottom section 622A may be fixed at one place.

In addition, a corner portion including one of the four vertexes C1 to C4 of the fixed substrate 51 may be fixed to one place, and in the same manner, a corner portion including one of the four vertexes C1' to C4' of the movable substrate 52 may be fixed at one place.

In any cases described above, the protrusion section 623 is provided between a fixed position of the fixing member 624 of the wavelength variable interference filter 5, and an internal surface of the concave section 622 which faces the fixed position.

For example, in a case of fixing a corner portion including the vertex C1', that is, a side surface including the side C1'-C4' from the side surface 51A including the side C1'-C2' over the vertex C1', the protrusion section 623 is provided at a position which faces a fixed position of each side surface that is fixed to the fixing member 624 in the internal surface of the concave section 622.

The respective embodiments described above exemplify a configuration in which the fixed substrate 51 of the wavelength variable interference filter 5 is fixed, but the invention is not limited to this, and may have a configuration in which the movable substrate 52 is fixed to the base 620. For example, a configuration may be used in which the wavelength variable interference filter 5 is disposed such that the fixed substrate 51 is directed toward the base 620, and the movable substrate 52 is fixed to the base 620.

Both the fixed substrate 51 and the movable substrate 52 may be fixed to the fixing member 624. For example, when a side surface of the wavelength variable interference filter 5 on the side C1'-C4' of the fixed substrate 51, or a side surface of the wavelength variable interference filter 5 on the side C2'-C3' is fixed by the fixing member 624, a side surface of the movable substrate 52 may also be fixed together with the side surface.

The respective embodiments described above exemplify a configuration in which the protrusion section 623 is provided to the base 620, but the invention is not limited to this. For example, the protrusion section 623 may be formed in at least one of the fixed substrate 51 and the movable substrate 52, that is, in the wavelength variable interference filter 5, and the protrusion section 623 may be formed in both the wavelength variable interference filter 5 and the base 620.

The respective embodiments described above exemplify a configuration in which the protrusion section 623 has a hemispherical shape in which a sectional area in a surface direction parallel to the fixed surface 621B decreases as it goes toward the protrusion direction, but the invention is not limited to this, and for example, the protrusion section 623 may have a pyramidal shape or a trapezoidal shape.

In addition, the invention is not limited to a configuration in which a sectional area of the protruding section 623 decreases as it goes toward the protrusion direction as described above, and the protruding section 623 may have a columnar shape whose sectional area is not substantially changed. Since the protrusion section 623 is caused to have, for example, a hemispherical shape so that the sectional area decreases, the protruding section 623 ensures rigidity, and thus it is possible to reduce a contact area between the wavelength variable interference filter 5 and the base 620.

The respective embodiments described above exemplify a configuration in which, as the gap change section, the electrostatic actuator 56 is included which changes the size of the gap G1 between the reflective films according to the electrostatic force by applying a voltage to the fixed electrode 561 and the movable electrode 562, but the invention is not limited to this.

For example, an induction actuator may be used as the gap change section. In this case, a configuration can be exemplified in which a first induction coil is disposed instead of the fixed electrode 561, and a second induction coil or a permanent magnet is disposed instead of the movable electrode 562.

Furthermore, a voltage actuator may be used as the gap change section. In this case, a configuration can be exemplified in which a lower electrode layer, a piezoelectric film, and an upper electrode layer are disposed so as to be stacked on the holding section 522, the piezoelectric film is expanded and contracted by varying a voltage that is applied between the lower electrode layer and the upper electrode layer as an input value, and then the holding section 522 is bent.

In addition, the respective embodiments exemplify a configuration in which the electrostatic actuator 56 that is the gap change section is provided in only one of a pair of substrates, but the invention is not limited to this, and the gap change section may be provided in both the substrates.

The respective embodiments described above exemplify the wavelength variable interference filter 5 in which the gap G1 between the reflective films is changeably configured, but the invention is not limited to this, and the wavelength variable interference filter 5 may be an interference filter in which the size of the gap G1 between the reflective films is fixed.

In addition, the respective films described above exemplify a configuration in which the wavelength variable interference filter 5 includes a pair of substrates 51 and 52 and a pair of reflective films 54 and 55 respectively provided in the respective substrates 51 and 52, but the invention is not limited to this. For example, a configuration may be provided in which the movable substrate 52 is not provided and the fixed substrate 51 is fixed to the case 610. In this case, for example, a configuration is provided in which a first reflective film, a gap spacer, and a second reflective film are formed so as to be stacked on a surface of a substrate (fixed substrate), and the first reflective film and the second reflective film face each other via a gap. In the configuration, one substrate is used, and thereby a light receiving element can be further thinned.

In addition, the color measurement device 1 according to the second embodiment is exemplified as the electronic apparatus of the invention, but in addition to this, the optical filter device, the optical module, and the electronic apparatus of the invention can be used in various fields.

Hereinafter, a modification example of an electronic apparatus which uses the optical filter device of the invention will be described. The electronic apparatus which will be hereinafter exemplified includes the optical filter device 600 and the wavelength variable interference filter 5 is contained in the case 610.

The electronic apparatus of the invention can be used as a system of an optical base for detecting the presence of a specific substance. A gas leakage detector for a vehicle which performs high sensitive detection of specific gas by adopting a spectroscopic measurement method that uses the wavelength variable interference filter included in the optical filter device of the invention, and a gas detecting device such as a photoacoustic noble gas detector for a breath inspection can be exemplified as the system.

An example of the gas detecting device will be hereinafter described with reference to the accompanying drawings.

Figure 12:
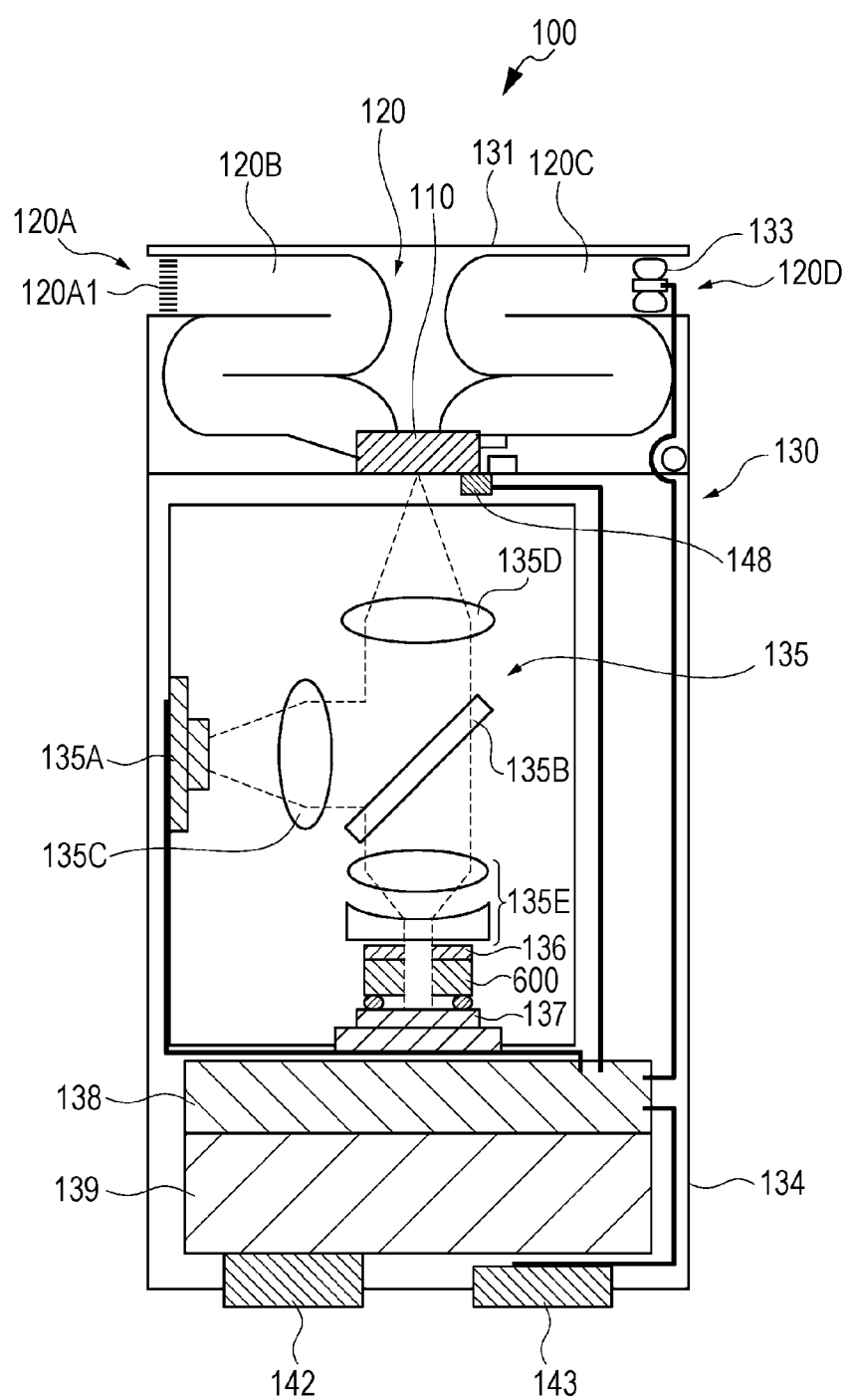
FIG. 12 is a schematic view illustrating a gas detection device that is an example of an electronic apparatus of the invention.

FIG. 12 is a schematic view illustrating an example of the gas detection device including the wavelength variable interference filter.

Figure 13:
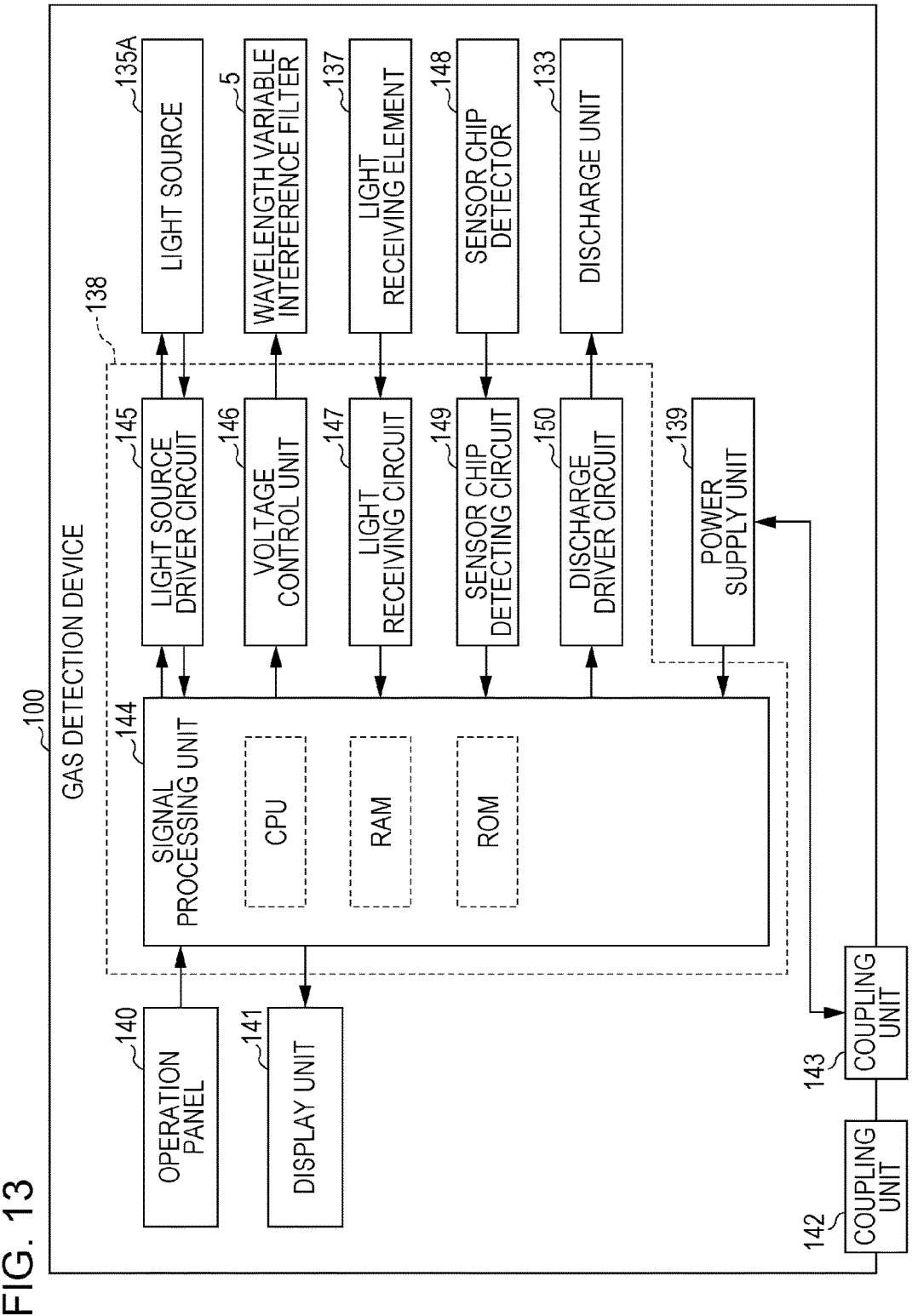
FIG. 13 is a block diagram illustrating a configuration of a control system of the gas detection device of FIG. 12.

FIG. 13 is a block diagram illustrating a configuration of a control system of the gas detecting device of FIG. 12.

As illustrated in FIG. 12, the gas detecting device 100 is configured to include a sensor chip 110, a flow path 120 that includes a suction hole 120A, a suction flow path 120B, a discharge flow path 120C, and a discharge hole 120D, and a body section 130.

The body section 130 is configured by a sensor unit cover 131 having an opening through which flow path 120 is attachable and detachable, a discharge unit 133, a case 134, an optical unit 135, a detection device that includes a filter 136, the optical filter device 600, a light receiving element 137 (detection unit) and the like, a control unit 138 that processes a detected signal and controls the detection unit, a power supply unit 139 that supplies power, and the like. In addition, the optical unit 135 is configured by a light source 135A that emits light, a beam splitter 135B that reflects the light incident from the light source 135A toward the sensor chip 110 and transmits the light incident from the sensor chip toward the light receiving element 137, a lens 135C, a lens 135D, and a lens 135E.

In addition, as illustrated in FIG. 13, an operation panel 140, a display unit 141, a coupling unit 142 for interfacing with an external device, and the power supply unit 139 are provided on a surface of the gas detecting device 100. If the power supply unit 139 is a secondary battery, a coupling unit 143 for charging may be provided.

Furthermore, as illustrated in FIG. 13, the control unit 138 of the gas detecting device 100 includes a signal processing unit 144 that is configured by a CPU or the like, a light source driver circuit 145 for controlling the light source 135A, a voltage control unit 146 for controlling the wavelength variable interference filter 5 of the optical filter device 600, a light receiving circuit 147 that receives a signal from the light receiving element 137, a sensor chip detecting circuit 149 which reads a code of the sensor chip 110 and receives a signal from a sensor chip detector 148 that detects presence or absence of the sensor chip 110, and a discharge driver circuit 150 that controls the discharge unit 133, and the like.

Subsequently, an operation of the gas detecting device 100 described above will be hereinafter described.

The sensor chip detector 148 is provided in the sensor unit cover 131 of the body section 130, and the sensor chip detector 148 detects presence or absence of the sensor chip 110. If a detection signal is detected from the sensor chip detector 148, the signal processing unit 144 determines that the sensor chip 110 is mounted, and outputs a display signal that displays information indicating that a detection operation can be performed on the display unit 141.

For example, if the operation panel 140 is operated by a user, and an indication signal indicating a start of detection processing is output to the signal processing unit 144 from the operation panel 140, the signal processing unit 144 first outputs a signal of a light source operation to the light source driver circuit 145, thereby operating the light source 135A. If the light source 135A is driven, stable laser light which is linearly polarized at a single wavelength is emitted from the light source 135A. In addition, a temperature sensor or a light amount sensor is embedded in the light source 135A, and information thereof is output to the signal processing unit 144. If it is determined that the light source 135A operates stably, based on the temperature and the amount of light which are received from the light source 135A, the signal processing unit 144 controls the discharge driver circuit 150 to operate the discharge unit 133. Accordingly, gas sample containing a target substance (gas molecules) to be detected is induced to the suction flow path 120B, the sensor chip 110, the discharge flow path 120C, and the discharge hole 120D from the suction hole 120A. A dust removal filter 120A1 is provided in the suction hole 120A, and relatively large dust, a part of vapor, or the like is removed.

In addition, the sensor chip 110 is a sensor in which a plurality of metallic nanostructures are incorporated and which uses localized surface plasmon resonance. In the sensor chip 110, enhanced electric field is formed between the metallic nanostructures by laser light, and if gas molecules are input to the enhanced electric field, Raman scattering light and Rayleigh scattering light which include information on molecule vibration are generated.

The Raman scattering light or the Rayleigh scattering light are incident on the filter 136 via the optical unit 135, the Rayleigh scattering light is separated by the filter 136, and the Raman scattering light is incident on the optical filter device 600. Then, the signal processing unit 144 controls the voltage control unit 146, adjusts a voltage that is applied to the wavelength variable interference filter 5 of the optical filter device 600, and divides the Raman scattering light corresponding to the gas molecules as a detection object using the wavelength variable interference filter 5 of the optical filter device 600. Thereafter, if the light receiving element 137 receives the divided light beams, a light receiving signal according to an amount of received light is output to the signal processing unit 144 via the light receiving circuit 147.

The signal processing unit 144 compares spectrum data of the Raman scattering light corresponding to the gas molecules as a detection object which is obtained by doing so, with the data stored in a ROM, determines whether or not the data is gas molecules of object, and specifies the substance. In addition, the signal processing unit 144 displays the result information on the display unit 141, or outputs the result information to an external device from the coupling unit 142.

FIG. 12 and FIG. 13 illustrate the gas detecting device 100 which divides the Raman scattering light using the wavelength variable interference filter 5 of the optical filter device 600, and detects gas from the divided Raman scattering light. In addition to this, the gas detecting device may be used as a gas detecting device which specifies gas type by detecting gas-specific absorbance. In this case, a gas sensor which introduces gas into the sensor and detects the light absorbed by the gas among the incident light beams, is used as the optical module of the invention. A gas detecting device which analyzes the gas introduced into the sensor by the gas sensor and determines the gas, can be used as the electronic apparatus of the invention. It is possible to detect gas components by using the wavelength variable interference filter, also in the configuration described above.

In addition, a system for detecting presence of a specific substance is not limited to detection of the gas described above, and can use a substance component analyzing device, such as a non-invasive measurement device which measures saccharide using near-infrared spectroscopy, or a non-invasive measurement device which measures information on foods, a living body, minerals, or the like.

Hereinafter, a food analyzing device will be described as an example of the substance component analyzing device.

Figure 14:
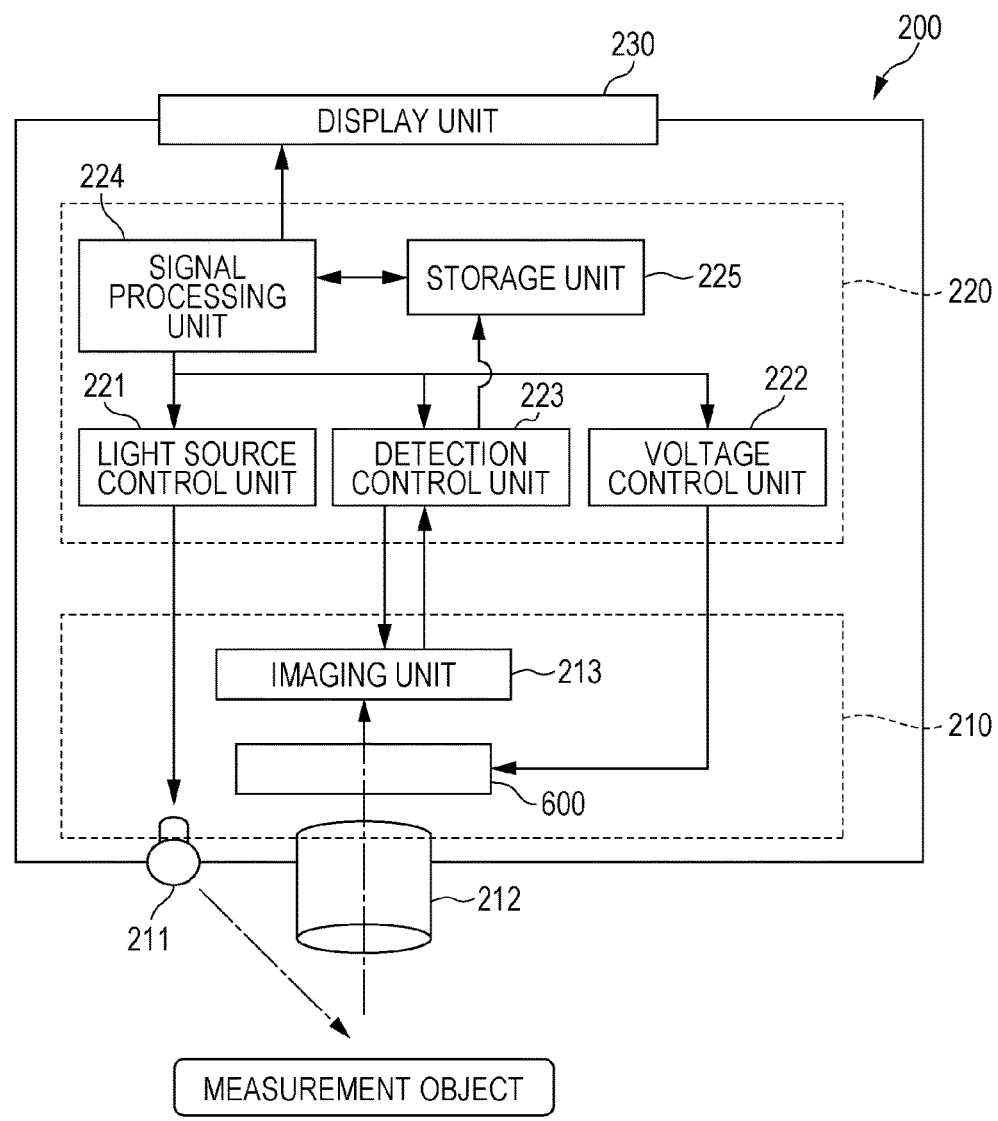
FIG. 14 is a diagram illustrating a schematic configuration of a food analyzing device that is an example of the electronic apparatus of the invention.

FIG. 14 is a diagram illustrating a schematic configuration of a food analyzing device that is an example of the electronic apparatus using the optical filter device 600.

As illustrated in FIG. 14, the food analyzing device 200 includes a detector 210 (optical module), a control unit 220, and a display unit 230. The detector 210 includes a light source 211 which emits light, an imaging lens 212 to which light is introduced from a measurement object, the optical filter device 600 which divides light that is introduced from the imaging lens 212, and an imaging unit 213 (detection unit) which detects the divided light.

In addition, the control unit 220 includes a light source control unit 221 which controls turning on or turning off the light source 211 and controls brightness at the time of turning on the light source, a voltage control unit 222 which controls the wavelength variable interference filter 5 of the optical filter device 600, a detection control unit 223 which controls the imaging unit 213 and acquires a spectral image that is captured by the imaging unit 213, a signal processing unit 224, and a storage unit 225.

In the food analyzing device 200, if the system is driven, the light source 211 is controlled by the light source control unit 221, and light is emitted from the light source 211 to the measurement object. Then, the light reflected by the measurement object is incident on the optical filter device 600 via the imaging lens 212. A voltage which can divide the light into light beams with desired wavelengths is applied to the wavelength variable interference filter 5 of the optical filter device 600, under the control of the voltage control unit 222, and the divided light beams are captured by the imaging unit 213 which is configured by, for example, a CCD camera or the like. In addition, the captured light is stored in the storage unit 225 as a spectral image. In addition, the signal processing unit 224 changes the value of the voltage that is applied to the wavelength variable interference filter 5 by controlling the voltage control unit 222, and thereby acquires the spectral images with respect to the respective wavelengths.

Then, the signal processing unit 224 performs arithmetic processing of data of each pixel with regard to each image which is stored in the storage unit 225, and obtains spectrum of each pixel. In addition, the storage unit 225 stores information on components of the food with respect to, for example, the spectrum. The signal processing unit 224 analyzes the data of the obtained spectrum, based on the information on the food that is stored in the storage unit 225, and obtains food components contained in a detection object and a contained amount thereof. In addition, food calories, freshness, or the like can be calculated from the components and contained amount of the food which are obtained. Furthermore, by analyzing spectrum distribution in an image, a portion in which the freshness is decreased in the food of an inspection object can be extracted, and a foreign substance or the like which is contained in the food can be further detected.

Thus, the signal processing unit 224 can perform processing of displaying information on the components or the contained amount of the food of the inspection object which are obtained by doing the processing described above, calories, freshness, or the like, on the display unit 230.

In addition, FIG. 14 illustrates an example of the food analyzing device 200, but substantially the same configuration can also be used as a non-invasive measurement device for other information described above. For example, the configuration can be used as a living body analyzing device that analyzes living body components, such as measurement or analysis of body fluid components such as blood. The living body analyzing device is, for example, a device which measures body fluid components such as blood. If the living body analyzing device is configured as a device that senses ethyl alcohol, the living body analyzing device can be used as a drunk driving prevention device which detects drinking state of a driver. In addition, it is possible to use an electronic endoscope system which includes the living body analyzing device.

Furthermore, the invention may also be used as a mineral analysis device which performs component analysis of mineral.

Furthermore, the wavelength variable interference filter, the optical module, and the electronic apparatus according to the invention can be applied to the following device.

For example, by temporally changing intensity of light of each wavelength, data can also be transmitted by the light of each wavelength, and in this case, light of a specific wavelength is divided by the wavelength variable interference filter provided in the optical module, the light receiving unit receives the divided light beams, and thereby it is possible to extract data which is transmitted by the light of a specific wavelength. Data of the light of each wavelength is processed by an electronic apparatus including an optical module for extracting the data, and thus it is also possible to perform optical communication.

In addition, the electronic apparatus divides light using the wavelength variable interference filter included in the optical filter device according to the invention, and thus the electronic apparatus can also be applied to a spectral camera which captures a spectral image, a spectral analyzer, or the like. As an example of the spectral camera, an infrared camera in which the wavelength variable interference filter is embedded can be used.

Figure 15:
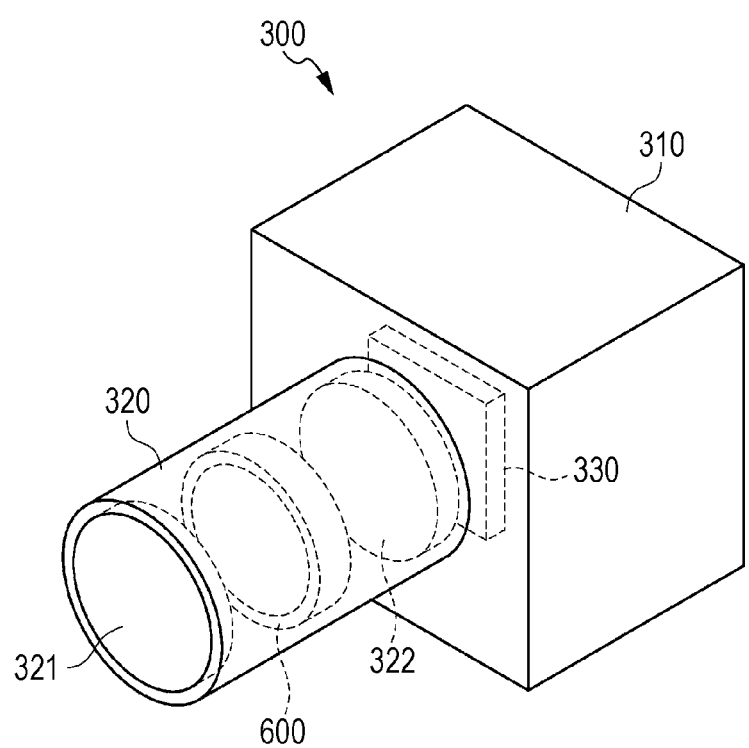
FIG. 15 is a schematic view illustrating a schematic configuration of a spectral camera that is an example of the electronic apparatus of the invention.

FIG. 15 is a schematic view illustrating a schematic configuration of a spectral camera. As illustrated in FIG. 15, the spectral camera 300 includes a camera body 310, an imaging lens unit 320, and an imaging unit 330 (detection unit).

The camera body 310 is a portion which is grasped and operated by a user.

The imaging lens unit 320 is provided in the camera body 310, and guides incident image light to the imaging unit 330. In addition, as illustrated in FIG. 15, the imaging lens unit 320 is configured to include an objective lens 321, an imaging lens 322, and the optical filter device 600 provided between the objective lens 321 and the imaging lens 322.

The imaging unit 330 is configured with a light receiving element, and captures the image light which is guided by the imaging lens unit 320.

In the spectral camera 300, the light of a wavelength which becomes an imaging object transmits the wavelength variable interference filter 5 of the optical filter device 600, and thereby it is possible to capture a spectral image of the light of a desired wavelength.

Furthermore, the wavelength variable interference filter included in the optical filter device according to the invention may be used as a band pass filter, and for example, may also be used as an optical type laser device in which only light of a narrow band around a predetermined wavelength, among light of a predetermined wavelength band which is emitted by the light emitting element, is divided and transmitted by the wavelength variable interference filter.

In addition, the wavelength variable interference filter included in the optical filter device according to the invention may be used as a biometric authentication device, and can also be applied to an authentication device which authenticates a blood vessel, a fingerprint, retina, iris, or the like, using, for example, light of a near-infrared region or a visible region.

Furthermore, the optical module and the electronic apparatus can be used as a concentration detecting device. In this case, infrared energy (infrared light) which is emitted from a substance is divided and analyzed by the wavelength variable interference filter, and thereby subject concentration of sample is measured.

As described above, the optical filter device and the electronic apparatus according the invention can also be applied to any device that divides predetermined light which is incident. As described above, the optical filter device can divide light of a plurality of wavelengths by using one device, and thus it is possible to accurately perform measurement of spectrum of a plurality of wavelengths, and detection with respect to a plurality of components. Therefore, the optical module or the electronic apparatus can be promoted to miniaturization, compared to a device of the related art which extract light of a desired wavelength using a plurality of devices, and can be suitably applied to, for example, a portable electronic apparatus or an electronic apparatus for a vehicle.

In the color measurement device 1, the gas detecting device 100, the food analyzing device 200, and the spectral camera 300 which are described above, an example is illustrated in which the optical filter device 600 according to the first embodiment is applied, but the invention is not limited to this. Of course, an optical filter device according to another embodiment can also be applied to the color measurement device 1 or the like, in the same manner as in the first embodiment.

In addition to this, a specific structure at the time of realizing the invention may be configured by appropriately combining the respective embodiments and the modification examples described above within a range in which object of the invention can be achieved, and in addition, may be appropriately changed to other structures or the like.

The entire disclosure of Japanese Patent Application No. 2014-198455 filed on Sep. 29, 2014 is expressly incorporated by reference herein.

What is claimed is:

1. An optical filter device comprising:
   an interference filter that includes a fixed substrate and a movable substrate, a reflective film formed on the fixed substrate and another reflective film formed on the movable substrate that faces the reflective film formed on the fixed substrate;
   a base section that has a bottom section and a side wall section; and
   a fixing member that is separate and apart from the fixed substrate, and which fixes a side surface of the fixed substrate to the side wall section,
   wherein the movable substrate is entirely separated from the bottom section by a hollow gap.

2. The optical filter device according to claim 1,
   wherein the fixing member is provided along a side that intersects the thickness direction of the side surface.

3. The optical filter device according to claim 1,
   wherein the fixing member is elastically deformed by stress according to rotation of the fixed substrate that arises at the side surface as a fixed end.

4. The optical filter device according to claim 1,
   wherein the base section faces the side surface and includes a fixed surface to which the side surface is fixed, and
   wherein one of the side surface and the fixed surface includes a protrusion section which protrudes toward the other of the side surface and the fixed surface and comes into contact with the other.

5. The optical filter device according to claim 4,
   wherein one of the side surface and the fixed surface includes a plurality of protrusion sections, and
   wherein each of the plurality of protrusion sections has a curved shape which protrudes toward the other.

6. The optical filter device according to claim 4,
   wherein the protrusion section is provided on the fixed surface side and has modulus of elasticity higher than that of the fixing member.

7. The optical filter device according to claim 1,
   wherein the interference filter further includes:
   a gap change section which changes a gap dimension between the reflective films,
   wherein the gap change section changes the gap dimension by bending the movable substrate toward the fixed substrate, and
   wherein the fixing member is elastically deformed by stress according to rotation of the fixed substrate that arises at a fixed position of the fixing member as a fixed end when the gap change section is driven.

8. An optical module comprising:
   the optical filter device according to claim 1.

9. An electronic apparatus comprising:
   the optical filter device according to claim 1; and
   a processing unit which performs processing based on light that is exited from the optical filter device.

10. The optical filter device according to claim 1, wherein the sidewall section surrounds the fixed substrate.

11. An optical filter device comprising:
    an interference filter that includes a fixed substrate and a movable substrate, and a pair of reflective films which face each other, and one of the pair of reflective films being provided on either the fixed substrate or the movable substrate;
    a base section that has a bottom section and a side wall section;
    a side surface of the fixed substrate is fixed to the side surface section by a fixing member, and the movable substrate is entirely separated from the bottom section by a gap;
    wherein another surface of the fixed substrate intersects with the side surface, and the another surface and the bottom section are disposed with another gap therebetween;
    wherein the base section faces the side surface and includes a fixed surface to which the side surface is fixed, and
    wherein one of the side surface and the fixed surface includes a protrusion section which protrudes toward the other of the side surface and the fixed surface and comes into contact with the other.

12. An optical filter device comprising: an interference filter that includes a fixed substrate and a movable substrate, a reflective film formed on the fixed substrate and another reflective film formed on the movable substrate that faces the reflective film formed on the fixed substrate;
- a base section that has a bottom section and a side wall section; and
- a fixing member which fixes a side surface of the fixed substrate to the side wall section,
- wherein the movable substrate is entirely separated from the bottom section by a gap,
- wherein the base section faces the side surface and includes a fixed surface to which the side surface is fixed, and
- wherein one of the side surface and the fixed surface includes a protrusion section which protrudes toward the other of the side surface and the fixed surface and comes into contact with the other.

13. The optical filter device according to claim 12,
- wherein one of the side surface and the fixed surface includes a plurality of protrusion sections, and
- wherein each of the plurality of protrusion sections has a curved shape which protrudes toward the other.

14. The optical filter device according to claim 12,
- wherein the protrusion section is provided on the fixed surface side and has modulus of elasticity higher than that of the fixing member.

15. The optical filter device according to claim 12,
- wherein the fixing member is provided along a side that intersects the thickness direction of the side surface.

16. The optical filter device according to claim 12,
- wherein the fixing member is elastically deformed by stress according to rotation of the fixed substrate that arises at the side surface as a fixed end.

17. The optical filter device according to claim 12,
- wherein the interference filter further includes a gap change section which changes a gap dimension between the reflective films,
- wherein the gap change section changes the gap dimension by bending the movable substrate toward the fixed substrate, and
- wherein the fixing member is elastically deformed by stress according to rotation of the fixed substrate that arises at a fixed position of the fixing member as a fixed end when the gap change section is driven.

18. An optical module comprising:
the optical filter device according to claim 12.

19. An electronic apparatus comprising:
the optical filter device according to claim 12; and
a processing unit which performs processing based on light that is exited from the optical filter device.

20. The optical filter device according to claim 12, wherein the sidewall section surrounds the fixed substrate.

* * * * *